US012292998B2

(12) United States Patent
LeCour

(10) Patent No.: US 12,292,998 B2
(45) Date of Patent: *May 6, 2025

(54) SYSTEMS AND METHODS FOR IDENTIFYING PERSONAL IDENTIFIERS IN CONTENT

(71) Applicant: Digital Guardian LLC, Eden Prairie, MN (US)

(72) Inventor: Richard Douglas LeCour, San Jose, CA (US)

(73) Assignee: DIGITAL GUARDIAN LLC, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,503

(22) Filed: Nov. 7, 2023

(65) Prior Publication Data

US 2024/0086571 A1    Mar. 14, 2024

Related U.S. Application Data

(63) Continuation of application No. 18/058,920, filed on Nov. 28, 2022, now Pat. No. 11,809,595, which is a continuation of application No. 15/837,172, filed on Dec. 11, 2017, now Pat. No. 11,531,779.

(51) Int. Cl.
*G06F 21/62* (2013.01)
*G06F 16/353* (2025.01)
*G06F 16/903* (2019.01)

(52) U.S. Cl.
CPC ........ *G06F 21/6245* (2013.01); *G06F 16/353* (2019.01); *G06F 16/90344* (2019.01)

(58) Field of Classification Search
CPC .................................................. G06F 21/6245
See application file for complete search history.

(56) References Cited

U.S. PATENT DOCUMENTS

| 7,467,202 B2 | 12/2008 | Savchuk |
| 7,885,944 B1 * | 2/2011 | Bruening ................ G06F 16/33 707/694 |
| 7,996,375 B2 | 8/2011 | Geva |

(Continued)

FOREIGN PATENT DOCUMENTS

| EP | 1329808 A2 | 7/2003 |
| WO | 2007087629 A1 | 8/2007 |

*Primary Examiner* — James R Turchen
(74) *Attorney, Agent, or Firm* — Fredrikson & Byron, P.A.

(57) ABSTRACT

Provided herein are systems and methods for identifying personal identifiers in content. An entity engine may receive content to identify candidate personal identifiers. The entity engine may determine that a text string in the content matches to a data format specified in entity definitions corresponding to types of personal identifiers and a rule for finding a geographic or linguistic term in the content correlated to the specific type of personal identifier. Each entity definition may specify a data format for finding a specific type of personal identifier in content. The data format corresponds to a type of personal identifier. The entity engine may identify, according to a rule of the first entity definition, a geographic or linguistic term in the content correlated to the type of personal identifier. The entity engine may classify the text string as the type of personal identifier, for preventing data breach or exfiltration.

18 Claims, 8 Drawing Sheets

(56) References Cited

U.S. PATENT DOCUMENTS

| | | | |
|---|---|---|---|
| 8,108,370 B1* | 1/2012 | Bruening | G06F 16/33 |
| | | | 707/827 |
| 8,326,866 B1 | 12/2012 | Upstill et al. | |
| 8,561,185 B1* | 10/2013 | Muthusrinivasan | G06F 21/577 |
| | | | 705/51 |
| 9,058,380 B2 | 6/2015 | Lesiecki et al. | |
| 9,230,101 B2 | 1/2016 | Zahran | |
| 9,349,016 B1 | 5/2016 | Brisebois et al. | |
| 9,495,639 B2 | 11/2016 | Lamanna et al. | |
| 9,691,027 B1 | 6/2017 | Sawant et al. | |
| 9,824,236 B2 | 11/2017 | Lynch et al. | |
| 2005/0022114 A1 | 1/2005 | Shanahan et al. | |
| 2008/0103798 A1 | 5/2008 | Domenikos et al. | |
| 2010/0250497 A1 | 9/2010 | Redlich et al. | |
| 2011/0150002 A1* | 6/2011 | Kim | H04L 69/22 |
| | | | 370/474 |
| 2014/0115710 A1 | 4/2014 | Hughes et al. | |
| 2015/0213358 A1 | 7/2015 | Shelton et al. | |
| 2015/0254469 A1* | 9/2015 | Butler | G06F 21/6218 |
| | | | 706/12 |
| 2017/0171234 A1* | 6/2017 | Christian | H04L 63/1425 |
| 2018/0027006 A1* | 1/2018 | Zimmermann | H04L 63/0227 |
| | | | 726/11 |
| 2018/0197105 A1* | 7/2018 | Luo | G06F 16/355 |
| 2019/0012476 A1* | 1/2019 | Dorogoy | G06F 21/60 |

* cited by examiner

US 12,292,998 B2

SYSTEMS AND METHODS FOR IDENTIFYING PERSONAL IDENTIFIERS IN CONTENT

RELATED APPLICATIONS

This application is a continuation of application Ser. No. 18/058,920, filed Nov. 28, 2022, which is a continuation of application Ser. No. 15/837,172, filed Dec. 11, 2017, the entire contents of each which are incorporated herein by reference.

TECHNICAL FIELD

The present application relates generally to systems and methods for data loss prevention, including but not limited to systems and methods for identifying personal identifiers.

BACKGROUND

In a computing environment, certain applications or a user may attempt to access or misuse data stored in a computing environment. A subset of the data may contain sensitive or confidential information. The exfiltration or misuse of such data may compromise the computing environment and/or the very data assets themselves. Current techniques for identifying data containing sensitive or confidential information are not sufficiently accurate.

SUMMARY

Described herein are systems and methods for classifying content to prevent data breach or exfiltration (e.g., opening, storing, downloading, uploading, movement). Various applications (e.g., web browsers, electronic mail applications, document processing applications, facsimile or printing applications, file/data transfer applications, and cloud storage applications), background system services (e.g., copy and paste operation, screenshot acquisition, and connection of removable computer storage), and/or other processes of a computing environment may attempt to access data. Such data may include document files, data strings, images, audio, or any other file format of data stored in the computing environment. A subset or constituent portion of the data may correspond to sensitive or confidential information, such as personal or security identifiers (e.g., account identifier, phone numbers, license plate numbers, birthdate, credit card numbers).

Such information may be identified as sensitive or confidential on a word-by-word or a phrase-by-phrase comparison with entries of a dictionary. The dictionary may include a large set of words or phrases marked as sensitive or confidential. Each entry may include a template of the word to account for slight variations (e.g., spacing, capitalization, plural form). Each word of a file may be compared against all the entries of the dictionary to determine whether the file contains sensitive or confidential information, such as personal identifiers. Without incorporating context or using other logic, however, such techniques may be inaccurate and may result in false positives for data breach/exfiltration/ misuse. Thus many of the data breaches and exfiltration attempts by or using applications from the computing environment may be carried out undetected.

To increase the accuracy of identifying data as containing classified or sensitive information, an entity engine executing in the computing environment may classify content into various content types by applying a set of predefined entity definitions. Each entity definition may include a combination of a regular expression, a set of terms, and/or a set of dictionary entries, among others for a particular content type (e.g., account identifier, phone numbers, license plate numbers, birthdate, credit card numbers).

Using the set of predefined entity definitions, the entity engine may classify the content into one of various content types, e.g., types of personal identifiers. In one embodiment, the entity engine may access memory of the computing environment to obtain content accessible by applications and/or users for classification. For each entity definition of the corresponding content type, the entity engine may determine whether there is secondary data present in the content, e.g., a geographic or linguistic term correlated to a predefined type of personal identifier, the secondary data specified by the regular expression (e.g., in an operand) of the entity definition. When the content is determined to have the secondary data, the entity engine may then apply the operand(s) of the regular expression to the content to match with the elements of the expression. Each element may be within a predefined proximity window for there to be a match. With each match, the entity engine may assign a weight or score. If the content is determined to have a match with all the elements/operands of the regular expression, the entity engine may classify the content into the corresponding content type with the determined score for the content type.

Additionally, to further increase the accuracy of identifying data as containing classified or sensitive information, each of the set of predefined entity definitions may also specify a data format for finding a particular type of personal identifier that may correspond to confidential or sensitive information (e.g., Social Security numbers, credit card numbers, addresses, e-mail addresses, phone numbers). The entity definition may also specify a rule for finding a geographic term or a linguistic term correlated to the specific type of personal identifier. The geographic term may be a name of a geographic region or any identifier associated with the geographic region, such as a physical address, email address, a telephone number, a postal code, a continent, a town name, a provincial name, and county name, among others. The linguistic term may be any set of alphanumeric characters, such as a word, expression, or any phrase relating to a particular formal or a natural language. The presence of the geographic and linguistic term in the content in conjunction with string matching the data format specified by the entity definition may be indicative of the existence of a personal identifier in the content.

With the set of predefined entity definitions specifying the data formats for finding particular types of personal identifiers, the entity engine may classify text string in the content as having one of the types of personal identifiers. The entity engine may parse the content to obtain a set of text strings. For each entity definition, the entity engine may determine whether a text string in the content matches the specified data format for the particular type of personal identifier. If the text string is determined to match the specified data format, the entity engine may identify a geographic term or a linguistic term correlated to the specific type of personal identifier in the text string of the content in accordance to the rule of the entity definition. The entity engine may assign a score for the type of personal identifier based on the match between the text string and the specified data format, and/or the identification of the geographic term or linguistic term of the rule in the text string. The entity engine may also identify a descriptive term for the particular type of identifier in the text string. The entity engine may determine whether the descriptive term is within a proximity window of the text string matching the data format, and assign the score based the determination of whether the descriptive term is within the proximity window. Based on the scoring for the particular type of personal identifier, the entity engine may classify the text string of the content as the personal identifier.

In comparison to the word-by-word dictionary approach, for instance, the use of the set of the predefined entity definitions in this manner may result in higher accuracy in identifying sensitive or confidential information contained in content. Moreover, the application of the operands upon determination of the presence of corresponding secondary data within the content may lead to lower false positives. Once the content has been classified to have a content type identified as containing sensitive or confidential information, the entity engine may for example identify activities corresponding to the data type, that are considered to be unauthorized or relate to data misuse/breach/exfiltration, and can prevent such unauthorized access or exfiltration of the content by any user or application running in the computing environment.

At least one aspect of the present disclosure is directed to a system for identifying personal identifiers in content. The system may include memory. The memory may store a plurality of entity definitions corresponding to a plurality of types of personal identifiers. Each entity definition may specify a data format for finding a specific type of personal identifier in content, and a rule for finding at least one of a geographic or linguistic term in the content correlated to the specific type of personal identifier. An entity engine executing on one or more processors may receive first content to identify one or more candidate personal identifiers. The entity engine may determine that a text string in the first content matches to a first data format specified in a first entity definition of the plurality of entity definitions. The first data format may correspond to a first type of personal identifier from the plurality of types of personal identifiers. The entity engine may identify, according to a first rule of the first entity definition, at least one of a geographic or linguistic term in the first content correlated to the first type of personal identifier. The entity engine may classify, responsive to the determination and the identification, the text string as the first type of personal identifier for preventing data breach or exfiltration.

In some embodiments, the entity engine may assign a score according to the matching of the text string to the first data format. In some embodiments, the entity engine may increase the score by an amount according to the identified at least one of a geographic or linguistic term in the first content correlated to the first type of personal identifier. In some embodiments, the entity engine may increase the score by an amount according to a level of correlation between the identified at least one of a geographic or linguistic term, and the first type of personal identifier. In some embodiments, the score may be indicative of a likelihood that the text string actually is a personal identifier of the first type.

In some embodiments, a geographic term may include a name or identifier of a geographic region, a name of an entity located in or associated with the geographic region, an address of the geographic region, or a physical address, email address or telephone number of an entity located in or associated with the geographic region. In some embodiments, the name or identifier of a geographic region may include one or more of: a postal code, a name or identifier of a place, state, census area, county, township, town, village, borough, parish, municipality, city, country or continent, or a name or identifier of a geological, cultural, historical or linguistic feature of the geographic region.

In some embodiments, a linguistic term may include a word, expression or reference relating to a spoken language, written language, culture, dialect or jargon, wherein the word, expression or reference includes at least one of: a letter, a character, a grapheme, a glyph, a ligature, a numeric digit, or a punctuation mark. In some embodiments, the entity engine may find an identifying or descriptive term for the first type of personal identifier, in the first content, and to classify the text string as the first type of personal identifier responsive to finding the identifying or descriptive term in the first content. In some embodiments, the entity engine may find the identifying or descriptive term located within a predefined level of proximity to the text string in the content.

At least one aspect of the present disclosure is directed to a method of identifying personal identifiers in content. An entity engine executing on one or more processors may receive first content to identify one or more candidate personal identifiers. The entity engine may determine that a text string in the first content matches to a first data format specified in a first entity definition of a plurality of entity definitions corresponding to a plurality of types of personal identifiers and a rule for finding at least one of a geographic or linguistic term in the content correlated to the specific type of personal identifier. Each entity definition may specify a data format for finding a specific type of personal identifier in content. The first data format corresponds to a first type of personal identifier from a plurality of types of personal identifiers. The entity engine may identify, according to a first rule of the first entity definition, at least one of a geographic or linguistic term in the first content correlated to the first type of personal identifier. The entity engine may classify, responsive to the determination and the identification, the text string as the first type of personal identifier for preventing data breach or exfiltration.

In some embodiments, the entity engine may assign a score according to the matching of the text string to the first data format. In some embodiments, the entity engine may increase the score by an amount according to the identified at least one of a geographic or linguistic term in the first content correlated to the first type of personal identifier. In some embodiments, the entity engine may increase the score by an amount according to a level of correlation between the identified at least one of a geographic or linguistic term, and the first type of personal identifier. In some embodiments, the score may be indicative of a likelihood that the text string actually is a personal identifier of the first type.

In some embodiments, a geographic term may include a name or identifier of a geographic region, a name of an entity located in or associated with the geographic region, an address of the geographic region, or a physical address, email address or telephone number of an entity located in or associated with the geographic region. In some embodiments, the name or identifier of a geographic region may include one or more of: a postal code, a name or identifier of a place, state, census area, county, township, town, village, borough, parish, municipality, city, country or continent, or a name or identifier of a geological, cultural, historical or linguistic feature of the geographic region.

In some embodiments, a linguistic term may include a word, expression or reference relating/corresponding/belonging to a spoken language, written language, culture, dialect or jargon, wherein the word, expression or reference includes at least one of: a letter, a character, a grapheme, a glyph, a ligature, a numeric digit, or a punctuation mark. In some embodiments, the entity engine may find an identifying or descriptive term for the first type of personal identifier, in the first content, and to classify the text string as the first type of personal identifier responsive to finding the identifying or descriptive term in the first content. In some embodiments, the entity engine may find the identifying or descriptive term located within a predefined level of proximity to the text string in the content.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

It should be understood that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the concepts disclosed herein will become more apparent from the detailed description set forth below when taken in conjunction with the drawings.

DETAILED DESCRIPTION

Following below are more detailed descriptions of various concepts related to, and embodiments of, inventive systems and methods for classifying content to prevent data breach or exfiltration. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes a network environment and computing environment which may be useful for practicing various computing related embodiments described herein.

Section B describes systems and methods for classifying content to prevent data breach or exfiltration.

Second C describes systems and methods for identifying personal identifiers in content to prevent data breach or exfiltration.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

A. Computing and Network Environment

Figure 1A:
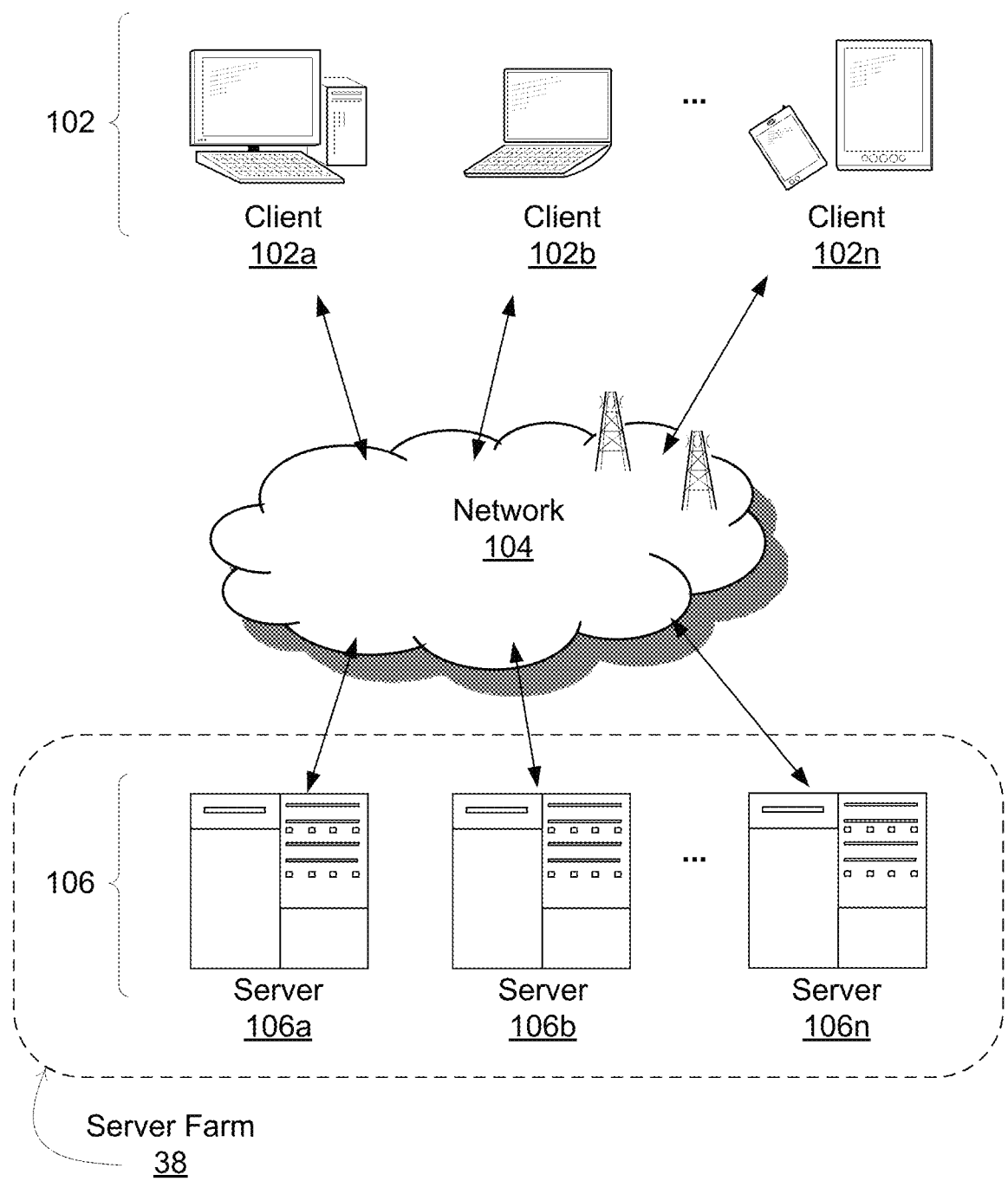
FIG. 1A is a block diagram depicting an embodiment of a network environment comprising client devices in communication with server devices.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the illustrated exploring network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106. The clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network, which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
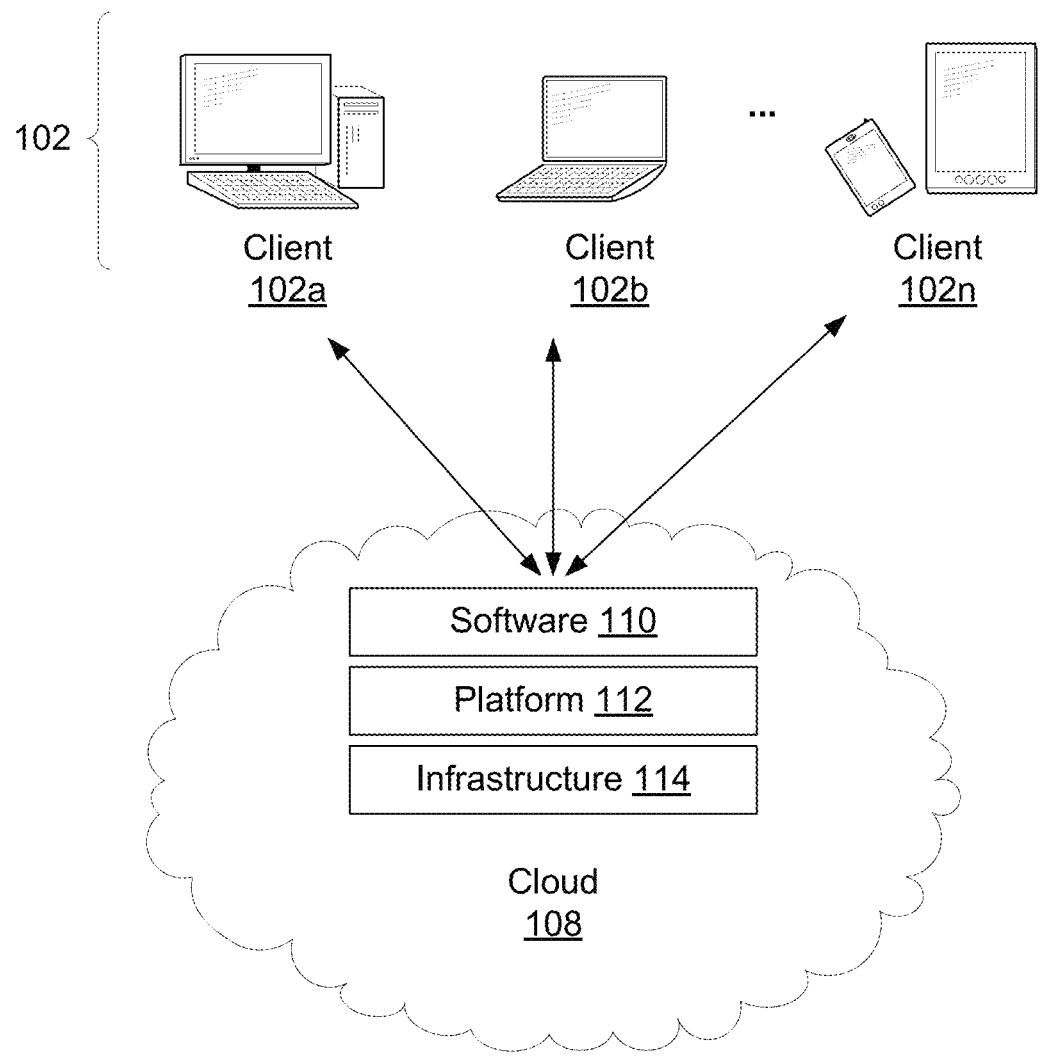
FIG. 1B is a block diagram depicting a cloud computing environment comprising client devices in communication with a cloud service provider.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
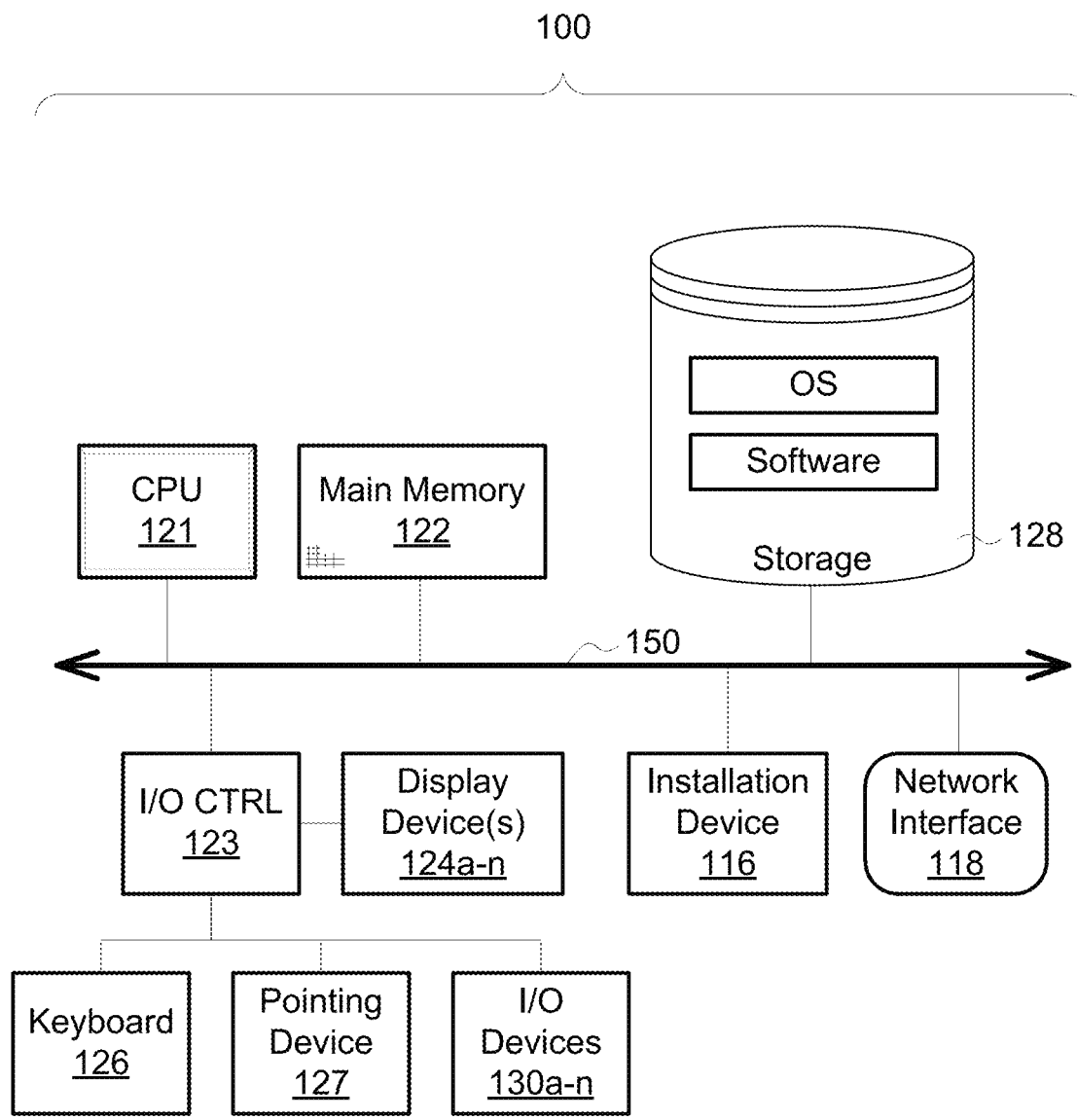
FIGS. 1C and 1D are block diagrams depicting embodiments of computing devices useful in connection with the methods and systems described herein.
Figure 1D:
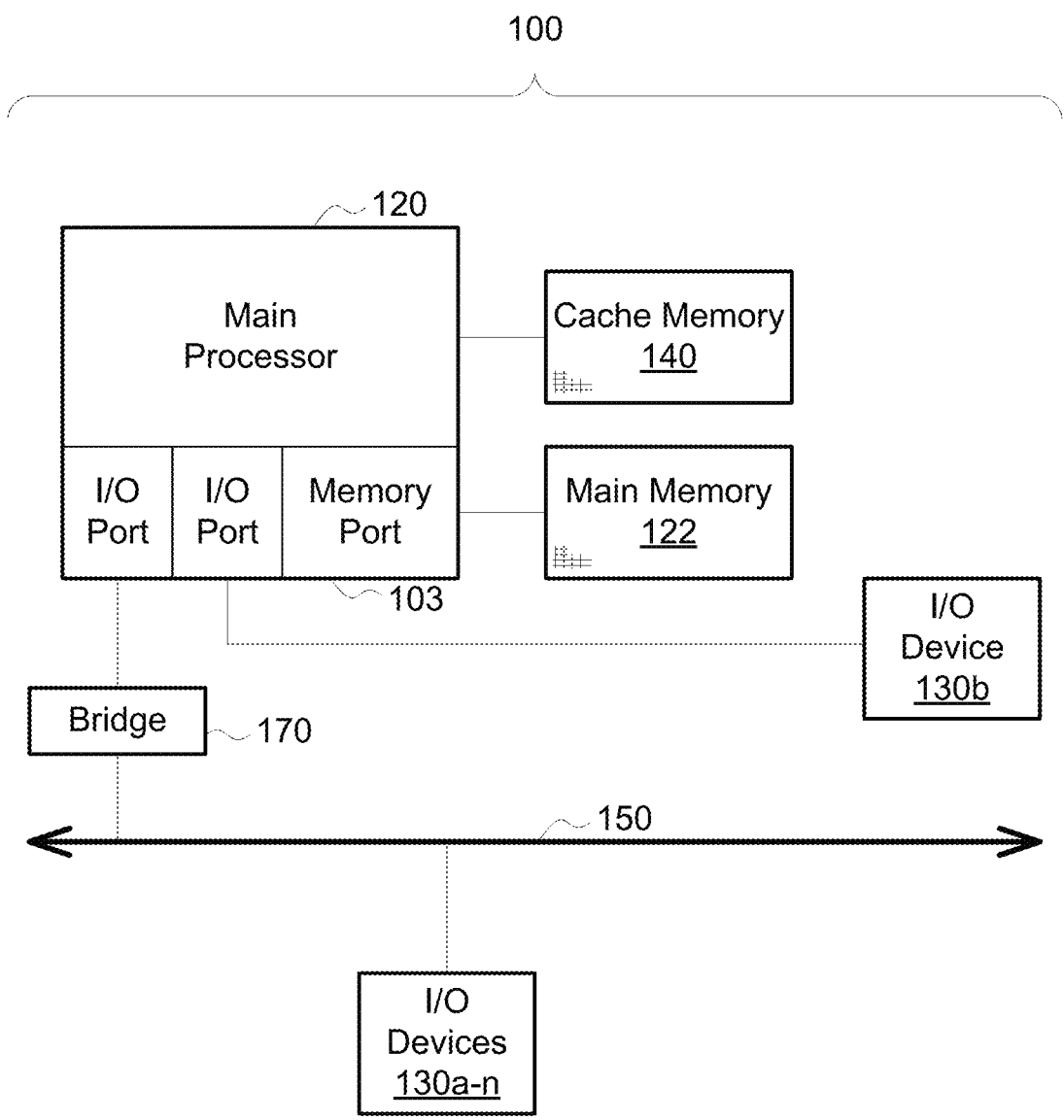

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, and/or software 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provides for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call. In some embodiments, the communication device 102 is a wearable mobile computing device including but not limited to Google Glass and Samsung Gear.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Classifying Content to Prevent Data Breach or Exfiltration Described herein are systems and methods for classifying content to prevent data breach or exfiltration (e.g., opening, storing, downloading, uploading, movement). Various applications (e.g., web browsers, electronic mail applications, document processing applications, facsimile or printing applications, file/data transfer applications, and cloud storage applications), background system services (e.g., copy and paste operation, screenshot acquisition, and connection of removable computer storage), and/or other processes of a computing environment may attempt to access data. Such data may include document files, data strings, images, audio, or any other file format of data stored in the computing environment. A subset or constituent portion of the data may correspond to sensitive or confidential information, such as personal or security identifiers (e.g., account identifier, phone numbers, license plate numbers, birthdate, credit card numbers).

Such information may be identified as sensitive or confidential on a word-by-word or a phrase-by-phrase comparison with entries of a dictionary. The dictionary may include a large set of words or phrases marked as sensitive or confidential. Each entry may include a template of the word to account for slight variations (e.g., spacing, capitalization, plural form). Each word of a file may be compared against all the entries of the dictionary to determine whether the file contains sensitive or confidential information. Without any incorporation of context or other logic, however, such techniques may be inaccurate and may result in false positives for data breach/exfiltration/misuse. Thus many of the data breaches and exfiltration attempts by or using applications from the computing environment may be carried out undetected.

To increase the accuracy of identifying data as containing classified or sensitive information, an entity engine executing in the computing environment may classify content into various content types by applying a set of predefined entity definitions. Each entity definition may include a combination of a regular expression, a set of terms, and/or a set of dictionary entries, among others for a particular content type (e.g., account identifier, phone numbers, license plate numbers, birthdate, credit card numbers). The regular expression may include a set of Boolean operands. Each term may specify a string of characters for the content type. Each dictionary entry may specify words or phrases for the content type. Each operand can refer to a pattern, the terms, the dictionary entries, and/or to another entity definition. Each entity definition may also include a proximity window, a minimum threshold score, and/or maximum score. The proximity window may specify a number of characters in which at least two of the patterns, the terms, and/or the dictionary entries is to occur for the content type. The minimum threshold score may specify a lower limit for scoring/rating an occurrence of a match using the Boolean operand, or for scoring/rating a classification of the content into the content type. The maximum score may specify an upper limit for scoring/rating an occurrence of a match using the Boolean operand. The range of numerical values for the score may correspond to a degree of confidence that the content corresponds to the respective content type. In addition, the set of Boolean operands for each regular expression may be order-dependent or independent. The regular expression may specify the application of one operand, upon the occurrence of secondary data. The secondary data may correspond to one of the terms or one of the dictionary entries, and may function as a condition precedent to the application of the one of the operands in the regular expression.

Using the set of predefined entity definitions, the entity engine may classify the content into one of various content types. In one embodiment, the entity engine may access memory of the computing environment to obtain content accessible by applications and/or users for classification. For each entity definition of the corresponding content type, the entity engine may determine whether there is secondary data present in the content, e.g., as specified by the regular expression (e.g., in an operand) of the entity definition. When the content is determined to have the secondary data, the entity engine may then apply the operand(s) of the regular expression to the content to match with the elements of the expression. Each element may be within the predefined proximity window for there to be a match. With each match, the entity engine may assign a weight or score bounded by the minimum and/or maximum scores. If the content is determined to have a match with all the elements/ operands of the regular expression, the entity engine may classify the content into the corresponding content type with the determined score for the content type.

In comparison to the word-by-word dictionary approach, for instance, the use of the set of the predefined entity definitions in this manner may result in higher accuracy in identifying sensitive or confidential information contained in content. Moreover, the application of the operands upon determination of the presence of corresponding secondary data within the content may lead to lower false positives. Once the content has been classified to have a content type identified as containing sensitive or confidential information, the entity engine may for example identify activities corresponding to the data type, that are considered to be unauthorized or relate to data misuse/breach/exfiltration, and can prevent such unauthorized access or exfiltration of the content by any user or application running in the computing environment.

Figure 2A:
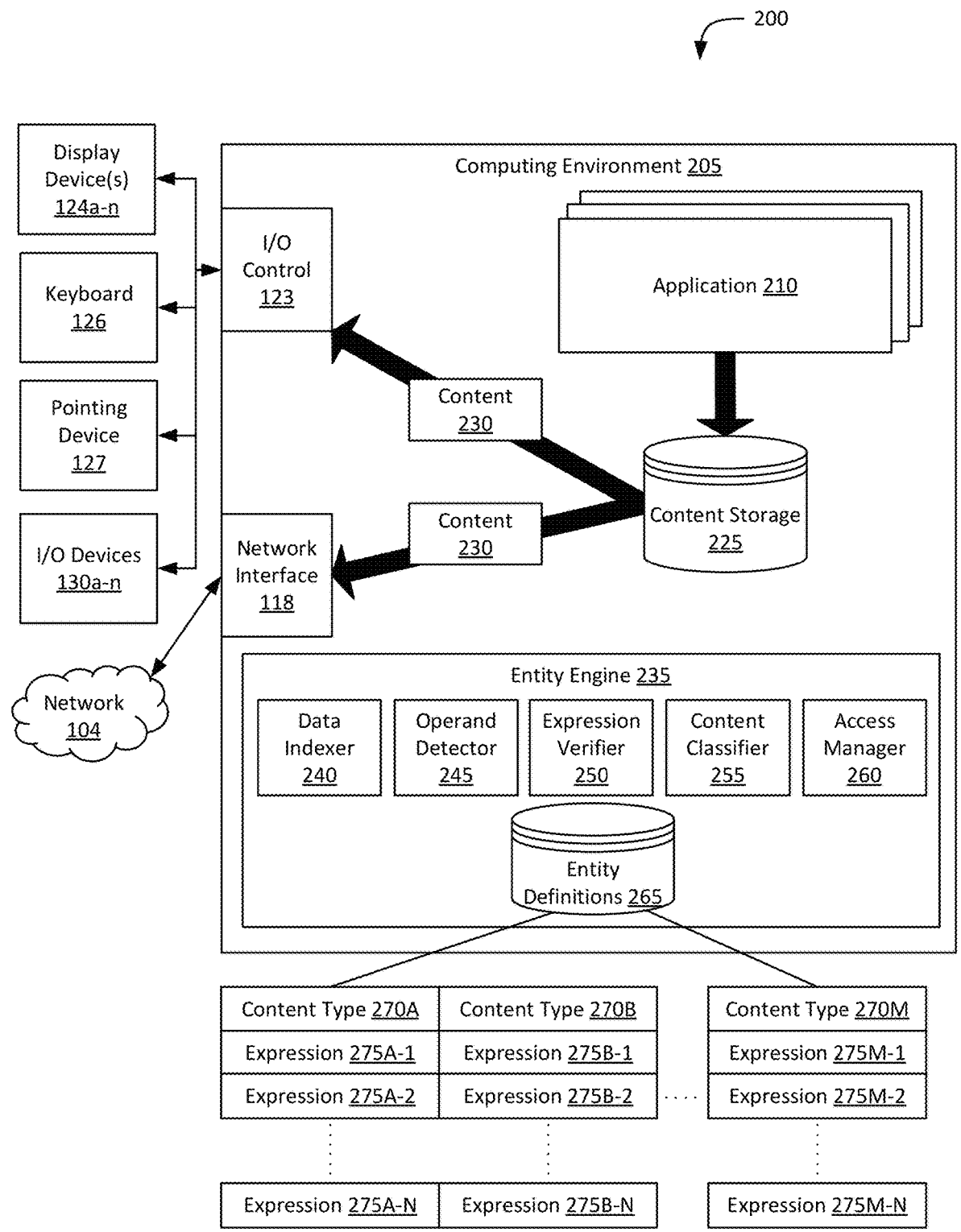
FIG. 2A is a block diagram depicting an example embodiment of a system for classifying content to prevent data breach or exfiltration.

Referring now to FIG. 2A, an embodiment of a system 200 for classifying content to prevent data breach or exfiltration or misuse is depicted. In brief overview, the system 200 may include a computing environment 205. The computing environment 205 may correspond to the computing device 100 as described in FIGS. 1C and/or 1D, and may include an application 210, a content storage 225, and/or an entity engine 235 which can interact with the network interface 118 and/or I/O control 123. The application 210 may comprise any type or form of software, script or program, such as a background system service or program. The content storage 225 may include or store content 230. The entity engine 235 may include a data indexer 240, an operand detector 245, an expression verifier 250, a content classifier 255, an access manager 260 and/or a dataset of entity definitions 265. The database of the entity definitions 265 may be stored on memory of the computing environment 205.

Each of the above-mentioned elements or entities (e.g., application 210, content storage 225, content 230, and entity engine 235 and its components) is implemented in hardware, or a combination of hardware and software, in one or more embodiments. For instance, each of these elements or entities could include any application, program, library, script, task, service, process or any type and form of executable instructions executing on hardware of the system, in one or more embodiments. The hardware includes circuitry such as one or more processors, for example, as described above in connection with FIGS. 1A-1D, in some embodiments, as detailed in section A.

In an attempt to access and/or transfer data from the computing environment 205, a user and/or an application 210 may perform an unauthorized or potentially risky access of the content storage 225. The application 210 may be any type of executable running on the computing environment 205, such as a cloud-synchronization application, an electronic mail application, a word processor application, a document-rendering application, a data transfer application, a data copying application, a facsimile application, or a printing application, among others. The attempt to perform the unauthorized access by the application 210 may be triggered by any selection of the graphical user interface elements, an invocation of an API function call, or otherwise another action/routine directly or indirectly initiated by the application 210, by multiple applications or by a user.

The attempt at an unpermitted or risky transfer of content 230 (e.g., stored on the content storage 225) from/within/to the computing environment 205 by the user or application 210. For instance, there may be an attempt to move or place sensitive data into a location which is not secured. And by way of example, a transfer of content from the computing environment 205 may occur in at least two ways. The application 210 may attempt to transfer the content 230 to the network interface 118 to transmit the content 230 via the network 104 to another computing device. The application 210 may attempt to transfer the content 230 to the I/O control 123 to output the content 230 on one of the I/O devices 130a—n, the display devices 124a—n, or another computer readable storage medium connected to the computing environment 205. An I/O device may include for instance a printer or fax machine, a flash drive or other peripheral/storage device that can receive files, an I/O interface to send files to a network or another device, or a user-input device (e.g., keyboard with print key) that can be used to perform or facilitate data movement. In some embodiments, the computing environment 205 may be used to transfer data from/via the network 104 to one or more I/O devices (e.g., an illegal or restricted destination or storage location). The I/O device can refer to software and/or hardware, for instance software that does the data exfiltration or movement (e.g., the web browser, the application), and/or the destination of the exfiltrated data.

To identify content 230 accessible by the user or application 210 as containing sensitive or confidential information, the data indexer 240 may receive content 230 for classification, e.g., for preventing data breach or exfiltration. In some embodiments, the data indexer 240 may access the content storage 225 to identify the content 230. Each content 230 may include one or more characters in the form of a string, some of which may correspond to sensitive or confidential information. The content storage 225 may correspond to one or more directories maintaining, storing or otherwise including the content 230. Each content 230 may correspond to the information on one or more files (e.g., document files, spreadsheet files, electronic emails, database files, image files, audio files, video files) stored within or otherwise accessible from the computing environment 205. Each content 230 may be stored on the storage 128, main memory 122, cache memory 140, I/O devices 130a-n, or any other computer readable storage medium connected to or within the computing environment 205. In some embodiments, the content 230 may span over multiple files stored on the computing environment 205. The one or more files including the content 230 of the content storage 225 may have one or more attributes. Each file may be associated with a residing location. The residing location may be a file pathname that may indicate a drive letter, volume, server name, root directory, sub-directory, file name, and/or extension among others. Each file may be associated with an owner indicated using a user identifier (e.g., username, screen name, account identifier, electronic mail address) for example. Each file may be associated with a source or author. Each file may be associated with a file type. Each file may be associated with a file system permission specifying ability to read, write, and execute for different applications 210 and users of the computing environment 205.

Once the content 230 (or data) accessible by the application 210 is identified, the entity definitions 265 stored in the database may be used to classify the content 230. The entity definitions 265 may be stored and maintained at the database using a data structure, such as an array, a matrix, a table, a linked list, a heap, a hash map, a binary tree, and a skip list, among others. Each entity definition may correspond to one of multiple content types or data types 270A-M (hereinafter generally referred to as content type 270). The entity definition for the content type 270 may include one or more Boolean expressions 275A-1 to 275M-N (hereinafter generally referred to as Boolean expression 275). Each Boolean expression 275 (sometimes referred to as "regular expression") of the content type 270 may specify one or more Boolean operators for a plurality of operands. The one or more Boolean operators may include disjunction ("OR"), conjunction ("AND"), negation ("NOT"), exclusive disjunction ("XOR"), alternative denial ("NOR"), joint denial ("NAND"), material implication ("If . . . then"), converse implication ("Not . . . without"), and/or bi-conditional ("If and only if"), among others.

Each operand of the Boolean expression 275 of the entity definition may include a matching element used to matching against the content 230 undergoing classification to one of the content types 270. Each operand for the matching element may correspond to one of a pattern, a term, a dictionary of words or phrases, or a reference to another entity definition to match against the content 230. The pattern may include a template for a set of characters. For example, the pattern may specify "xxx-xx-xxxx", where "x" corresponds to a numerical value and "-" is a hyphen. The term may include a specific string of characters (e.g., "California" or "resident"). The dictionary may include a string of characters corresponding to a word or a phrase. In some embodiments, the dictionary may include a list of entries. Each entry of the dictionary may include a string of characters corresponding to the word or the phrase. In some embodiments, the list of entries may be specified to be case insensitive or case sensitive. For example, the entry "London" may be used to match with "London", "LONDON", and "LoNdOn," among others, in the dictionary. In some embodiments, the list of entries may include variations in the word or the phrase to account for differences in spacing and punctuation. For example, the entry "P.O. Box" in the dictionary may be used to also match with "P.O. Box" and "P. O. Box", among others. In some embodiments, the operand may reference another entity definition to match against. The operand may be determined to match, upon determination that the other entity definition is matched. In some embodiments, the other entity definition in the database 265 may be referenced using an entity identifier.

At least one of the operands of the Boolean expression 275 may correspond to or specify the secondary data that should be present in the content 230. The presence of the secondary data in the content 230 may function as a condition precedent for application of the respective operator and/or matching element of the Boolean expression 275. In some embodiments, one or more of the operands may each specify secondary data that is to be present in the content 230. The Boolean expression 275 may specify a conjunction ("AND") between an operand that specifies the secondary data, and another operand. In some embodiments, the same operand may specify the matching element to match against the content 230 as well as the secondary data that should be present in the content 230. In some embodiments, some operands may specify the matching element to match against the content 230, without specifying any secondary data that should be present in the content 230. In some embodiments, a set of secondary data may be specified over/for a set of multiple operands of the Boolean expression 275. For each operand in the set, the same set of the secondary data that should be present in the content 230 may be specified.

The secondary data that should be present in the content 230 may include one or more terms and/or one or more entity identifiers. Each term may include a specific set of characters. Each entity identifier may reference another entity definition in the database 265. The secondary data may be determined to be present in the content 230 upon determination that the other entity definition is matched. In some embodiments, the one or more terms and/or the one or more entity identifiers may be relevant or correlate to a context of the corresponding matching element. The context may be homonymic, synonymic, or antonymic, among others. The homonymic context may refer to sets of characters with similar lexical representation but differing semantic information. For example, a set of terms for a homonymic context may include "May Fournier" and "May Fourth." The synonymic context may refer to sets of characters with similar semantic information. For example, a set of terms for a single synonymic context may include "carbon dioxide", "hydrochloric acid", "pectin", "sodium chloride", and "zinc," as these terms are chemicals. The antonymic context may refer to sets of characters with differing or opposing semantic information. For example, a set of terms for an antonymic context may include "dark" and "light." In some embodiments, the one or more terms correlating to the context may be defined by a semantic network. The semantic network may include a set of nodes and vertices. Each node may represent a word or phrase. Each vertex may connect two nodes, and may indicate a semantic relationship (e.g., homonymic, synonymic, or antonymic) between the words or phrases associated with the two nodes of the semantic network.

The Boolean expression 275 may also specify for the validation of a string of characters. The validation applied on each subgroup of the string of characters may be in addition to the application of the operators and/or the operands (e.g., application of a matching element of an operand, such as a regular expression) specified by the Boolean expression 275. The validation may use a checksum algorithm and/or an error-detection code algorithm. In some embodiments, the Boolean expression 275 may specify for the application of the Luhn algorithm (e.g., modulus 10) to validate the string of characters. The validation may leverage a predefined pattern of characters in the subgroup of characters for the particular content type 270. For example, each character in certain strings of characters (e.g., Social Security numbers, bank card number, security codes, and dates) may follow a predefined pattern that may be leveraged by the validation algorithm. The Boolean expression 275 may specify the application of a quantifier to one or more subgroups of characters. In some embodiments, Boolean expression 275 may also specify the application of the quantifier to be restricted to a particular subgroup of characters. For example, the Boolean expression 275 may specify the validation in the form of "\b(sociallssn)\s+([0-9]{3}(\-?)[0-9]{2}\3[0-9]{4})\b" to verify Social Security numbers. In this example, this regular expression may be used to validate "ssn 564-76-8334" or "social 872486838" as the content type 270 corresponding to Social Security numbers.

In some embodiments, one or more operands of the Boolean expression 275 may specify a weight for determining a matching score for the operand. The weight may indicate a constituent score for the total matching score, upon determination that the content 230 matches the matching element for the operand. In some embodiments, the weight may be a multiplicative factor. In some embodiments, the weight may be a numerical value and may range from 0 to 1, −1 to 1, 0 to 10, −10 to 10, and −100 to 100, or any other range of values. In some embodiments, the sum of the weights for all the operands of the Boolean expression 275 may equal 100. In some embodiments, the weight for at least one of the operands of the Boolean expression 275 may equal zero. The operand corresponding to a weight of zero may not contribute to the overall score of the content type 270 but may be used to evaluate whether the content 230 matches the Boolean expression 275 for the content type 270. In some embodiments, each operand may specify a maximum score for a matching score for the matching element of the operand. The maximum score may specify an upper bound to the matching score for matching the matching element of the operand.

The Boolean expression 275 may further specify a proximity window for two or more of the operands for the Boolean expression 275 for the corresponding content type 270. In some embodiments, the proximity window may be for all the operands of the Boolean expression 275. The proximity window may specify a number of characters or terms within which at least two of the operands are to occur for the classification of the content 230 as the content type 270. In some embodiments, the Boolean expression 275 may specify a plurality of proximity windows. Each proximity window may specify a number of characters or terms within which at least two of the operands are to occur for the classification of the content 230 as the content type 270. The Boolean expression 275 may specify a sequential order of operands to classify the content 230 as the content type 270. The sequential order may indicate a sequence in which the operands of the Boolean expression 275 are to occur to classify the content 230 as the content type 270. In some embodiments, the Boolean expression 275 may specify the sequential order for each proximity window for two or more operands of the Boolean expression 275 for the corresponding content type 270.

The Boolean expression 275 may specify a minimum number of match occurrences for each operand for classification of the content 230 as the corresponding content type 270. The minimum number of match occurrences may indicate a minimum number of the operands that the content 230 is to match for the content 230 to be classified as the content type 270 corresponding to the Boolean expression 275. The Boolean expression 275 may specify a minimum threshold score for all the matching elements with the content 230 for classification of the content 230 as the corresponding content type 270. The minimum threshold score may indicate a minimum sum of scores or weights from the matches with all the operands matching with the content 230 for classification of the content 230 as the corresponding content type 270.

Each entity definition may be predefined in the database 265, and may be used to identify whether the content 230 corresponds to a content type that is known or expected to contain sensitive or confidential information. In some embodiments, the entity definitions may be specified using Extensible Markup Language (XML). The entity definition may, for example, be in the form:

```
<entity>
  <item>
    <ouid>entity.ssn.us</ouid>
    <name>Social Security Numbers (US)</name>
    <proximity>200</proximity>
    <min_score>20</min_score>
    <rule>
      <operator>and</operator>
      <rule>
        <operator>or</operator>
        <operand>
          <ref>pattern.ssn.us.rnd</ref>
          <weight>15</weight>
          <max_score>100</max_score>
        </operand>
```

-continued

```
        <operand>
          <ref>pattern.ssn.us.rnd_fmt</ref>
          <weight>12</weight>
          <max_score>100</max_score>
        </operand>
        <operand>
          <ref>pattern.ssn.us.rnd_unf</ref>
          <weight>10</weight>
          <max_score>100</max_score>
        </operand>
      </rule>
      <rule>
        <operator>or</operator>
        <operand>
          <ref>terms.ssn.en</ref>
          <weight>5</weight>
          <max_score>5</max_score>
        </operand>
        <operand>
          <ref>dictionary.proper_names.us</ref>
          <weight>5</weight>
          <max_score>5</max_score>
        </operand>
        <operand>
          <ref>pattern.addr.us.state_zip</ref>
          <weight>5</weight>
          <max_score>5</max_score>
        </operand>
      </rule>
    </rule>
  </item>
</entity>
```

Using the entity definitions stored in the database 265, the operand detector 245 may determine whether that secondary data is present in the content 230. The secondary content may be defined by one or more of the operands of the Boolean expression 275 for each entity definition. In some embodiments, the operand detector 245 may parse the content 230 to identify a string of characters. Each term may correspond to one or more characters in the content 230. The operand detector 245 may traverse through the string of characters identified from the content 230. Concurrently or separately, the operand detector 245 may also traverse through the Boolean expressions 275 of each content type 270. For each Boolean expression 275, the operand detector 245 may identify the secondary data defined by at least one of the operands of the Boolean expression 275. The secondary data may be defined by one of the operands in the Boolean expression 275, for example, in the following form:

```
<operand type="secondary">
  <ref>pattern.addr.us.state_zip</ref>
  <weight>5</weight>
  <max_score>5</max_score>
</operand>
```

While traversing the string of characters, the operand detector 245 may compare with the operand defining the secondary data for the content type 270. As discussed previously, the operand may include a matching element for the subset of strings of characters forming the content 230 to match. Furthermore, some operands of the Boolean expression 275 may specify the presence of the secondary content in the content 230, in addition to the matching element. In some embodiments, the operand detector 245 may apply the operand defining the secondary data for the content type 270 to the subset of strings of characters forming the content 230. If none of the subset of strings of characters forming the content 230 is determined to match the operand defining the secondary data, the operand detector 245 may determine that the secondary data is not present in the content 230. On the other hand, if at least one subsets of strings of characters forming the content 230 is determined to match the operand defining the secondary data of the content type 270, the operand detector 245 may determine that the secondary data is present in the content 230.

Once the secondary data is determined to be present in the content 230 for the content type 270, the expression verifier 250 may determine whether there is match between the matching elements of the operands of the Boolean expression 275 against the content 230. The expression verifier 250 may identify the one or more Boolean expressions 275, each with the operand defining the secondary data present in the content 230. For each Boolean expression 275, the expression verifier 250 may then apply the operands of the Boolean expression 275 to the content 230. In some embodiments, the expression verifier 250 may traverse through the string of characters forming the content 230. The expression verifier 250 may also traverse through the remaining operands of each Boolean expression 275 with at least one operand defining at least one corresponding secondary data that should be present in the content 230. For each string of characters, the expression verifier 250 may determine whether there is a match between the string of characters and the matching element of the operand.

The expression verifier 250 may also validate each subgroup of each string of characters. The subgroup may correspond to a subset of characters included in the string of characters, (e.g., words or characters separated by spacing or delimiter). The validation applied on each subgroup of the string of characters by the expression verifier 250 may be in addition to the application of the operators and/or the operands specified by the Boolean expression 275. For each subgroup of each string of characters, the expression verifier 250 may validate the subgroup using a checksum algorithm and/or an error-detection code algorithm. In some embodiments, the expression verifier 250 may apply a Luhn algorithm (e.g., modulus 10) to validate the subgroup of each string of characters. The validation applied by the expression verifier 250 may leverage a predefined pattern of characters in the subgroup of characters for a particular content type 270. For example, each character in certain strings of characters (e.g., Social Security numbers, bank card number, security codes, and dates) may follow a predefined pattern that may be leveraged by the validation algorithm applied by the expression verifier 250. In some embodiments, the validation to be applied by the expression verifier 250 may be predefined by the Boolean expression 275. The Boolean expression 275 may specify the application of a quantifier to one or more subgroups of characters. In some embodiments, Boolean expression 275 may also specify the application to qualifier to be restricted to a particular subgroup of characters. For example, the Boolean expression 275 may specify the validation in the form of "\b(social|ssn)\s+([0-9]{3}(\-?) [0-9] {2} \3[0-9]{4})\b" to verify a Social Security number. In this example, this regular expression may be used to validate "ssn 564-76-8334" or "social 872486838" as Social Security numbers.

For each match between the string of characters and the matching element of the operand, the expression verifier 250 may update a matching score for the content type 270. In some embodiments, the expression verifier 250 may identify a weight for the match with the matching element of the operand. As discussed above, the Boolean expression 275 may specify a weight for determining a match between the content 230 and the respective operand. In response to each match, the expression verifier 250 may add the weight to the matching score for the content type 270. In some embodiments, the expression verifier 250 may apply the weight as a multiplicative factor to the constituent score for the match between the matching element and the string of characters forming the content 230. Based on the weights for each match between the matching element and the string of characters, the expression verifier 250 may determine or otherwise calculate a matching score for the content type 270. In some embodiments, the expression verifier 250 may maintain a counter to keep track of a number of matches between the content 230 and the operands of the Boolean expression 275. For each match determined between the matching element and the string of characters, the expression verifier 250 may increment the counter for the number of matches.

In some embodiments, between two matches of the string of characters with the two respective matching elements, the expression verifier 250 may update the matching score in accordance with the Boolean operator specified by the Boolean expression 275. The expression verifier 250 may identify the Boolean operator to be applied to the two operands. The expression verifier 250 may apply the Boolean operator to the two operands. If the Boolean operator is a disjunction ("OR"), the expression verifier 250 may add the resultant scores corresponding to the operands when either operand is determined to match. If the Boolean operator is a conjunction ("AND"), the expression verifier 250 may add the two resultant matching scores when both operands are determined to match. If the Boolean operator is a negation ("NOT") to one of the operands, the expression verifier 250 may nullify or negate the resultant score for the matching element corresponding to the operand. Summations of the matching scores for the other Boolean operators may be performed by composing the resultant scores using disjunctions, conjunctions, and/or negations. For example, if the Boolean operator is a material implication ("If . . . then"), the expression verifier 250 may nullify or negate the first matching score corresponding to the first operand and add to the second matching score corresponding to the second operand. The expression verifier 250 may apply all the Boolean operators specified by the Boolean expression 275 to calculate the aggregate matching score for the content type 270.

Based on the application of all the operands and operators of the Boolean expression 275 on the content 230, the content classifier 255 may classify the content 230 into the content type 270 corresponding to the Boolean expression 275. If the strings of characters of the content 230 are determined not to match with all of the matching elements of the remaining operands as specified by the operators of the Boolean expression 275, the content classifier 255 may determine not to classify the content 230 as the content type 270. Conversely, if the strings of character of the content 230 are determined to match with all the remaining elements of the operands as specified by the operators of the Boolean expression 275, the content classifier 255 may classify the content 230 into the content type 270. In some embodiments, the content classifier 255 may classify the content 230 into the content type 270 based on the matches between the matching element of each operand to the strings of characters forming the content 230. In some embodiments, the content classifier 255 may use the matches with the operands and the predefined proximity window specified by the Boolean expression 275 to classify the content 230 into the corresponding content type 270. In some embodiments, the content classifier 255 may compare the matching score to a minimum threshold score of the Boolean expression 275 to classify the content 230 into the corresponding content type 270.

With multiple matches between the string of characters and the matching element, the content classifier 255 may determine whether two matching elements occur within the predefined proximity window specified by the Boolean expression 275. As discussed above, the proximity window may specify a number of characters or terms within which at least two of the operands are to occur for the classification of the content 230 as the content type 270. In some embodiments, the content classifier 255 may identify a first index number for a first match and a second index number of a second match. The first index number may indicate a position of the string of characters determined to match the matching element for the first match within the content 230. The second index number may indicate a position of the string of characters determined to match the matching element for the second match within the content 230. The content classifier 255 may calculate an index difference between the first index number and the second index number. The expression verifier 250 may compare the index difference to the proximity window. If the index difference is determined to be greater than the proximity window, the content classifier 255 may determine that the two corresponding matches are outside the proximity window. If at least one of the two matches is determined to be outside the proximity window, the content classifier 255 may determine that the content 230 is not to be classified as the content type 270.

On the other hand, if the index difference is determined to be less than or equal to the proximity window, the content classifier 255 may determine that the two corresponding matches are within the proximity window. The content classifier 255 may continue to determine whether the other index differences are within the proximity window. Additionally, the content classifier 255 may determine whether the operands occurs in the sequential order within the proximity window as specified by the illustrative Boolean expression 275:

```
<entity>
   <item>
      <ouid>entity.ssn.us</ouid>
      <name>Social Security Numbers (US)</name>
      <proximity>200</proximity>
      <proximity_orders>
      <proximity_order>
         <operand>O1</operand>
         <operand>O3</operand>
      </proximity_order>
      <proximity_order>
         <operand>O2</operand>
         <operand>O3</operand>
      </proximity_order>
      </proximity_orders>
         <min_score>20</min_score>
         <rule>
         ...
         </rule>
   </item>
</entity>
```

If all the index differences for the matches of operands are determined to be less than or equal to the proximity window in the order specified by the sequential order, the content classifier 255 may determine that the content 230 is to be classified as the content type 270.

Having applied all the operands and operators of the Boolean expression 275, the content classifier 255 may compare the matching score to the minimum threshold score specified by the Boolean expression 275 for the content type 270. As discussed above, the minimum threshold score may specify a minimum sum of scores and/or weights from the matches with all the operands matching with the content 230 for classification of the content 230 as the corresponding content type 270. If the total matching score is determined to be less than or equal to the minimum threshold score, the content classifier 255 may determine that the content 230 is not to be classified as the content type 270. On the other hand, if the total matching score is determined to greater than the minimum threshold score, the content classifier 255 may determine that the content 230 is to be or can be classified as the content type 270.

In some embodiments, the content classifier 255 may compare the number of matches to the minimum number of occurrences across the operands for the classification of the content 230 as the content type 270. As discussed previously, the minimum number of match occurrences may indicate a minimum number of the operands that the content 230 is to match for the content 230 to be classified as the content type 270 corresponding to the Boolean expression 275. The operand for the minimum number of matches may specified, for example, in the following illustrative manner using XML:

```
<operand type="secondary">
   <ref>pattern.addr.us.state_zip</ref>
   <weight>5</weight>
   <max_score>5</max_score>
   <min_occurs>4</min_occurs>
</operand>
```

The content classifier 255 may identify the number of matches from the counter for keeping track. If the total number of occurrences is determined to be less than or equal to the minimum number of occurrences, the content classifier 255 may determine that the content 230 is not to be classified as the content type 270. On the other hand, if the total number of occurrence is determined to greater than the minimum number of occurrence, the content classifier 255 may determine that the content 230 is to be or can be classified as the content type 270.

Upon classifying the content 230 as one of the content types using the entity definitions, the access manager 260 may manage the content 230 for data loss prevention to prevent data breach or exfiltration by the application 210 in the computing environment 205. In some embodiments, the access manager 260 may assign a severity level to each content type 270 of the entity definitions stored in the database 265. The severity level may be predefined based on the content type 270, and may be a numerical value. The severity level may also indicate a degree of sensitivity or confidentiality of the type of the information corresponding to the content type 270. In some embodiments, the access manager 260 may perform a set of actions on the content 230 for data loss prevention in accordance to the severity level of the content type 270 to which the content 230 is classified into. The set of actions may include warning the user of potential data breach (e.g., by displaying a prompt), blocking access of the content 230 by the application 210, restricting exfiltration of the content 230 via the I/O control 123 and/or the network interface 118, among other measures.

Figure 2B:
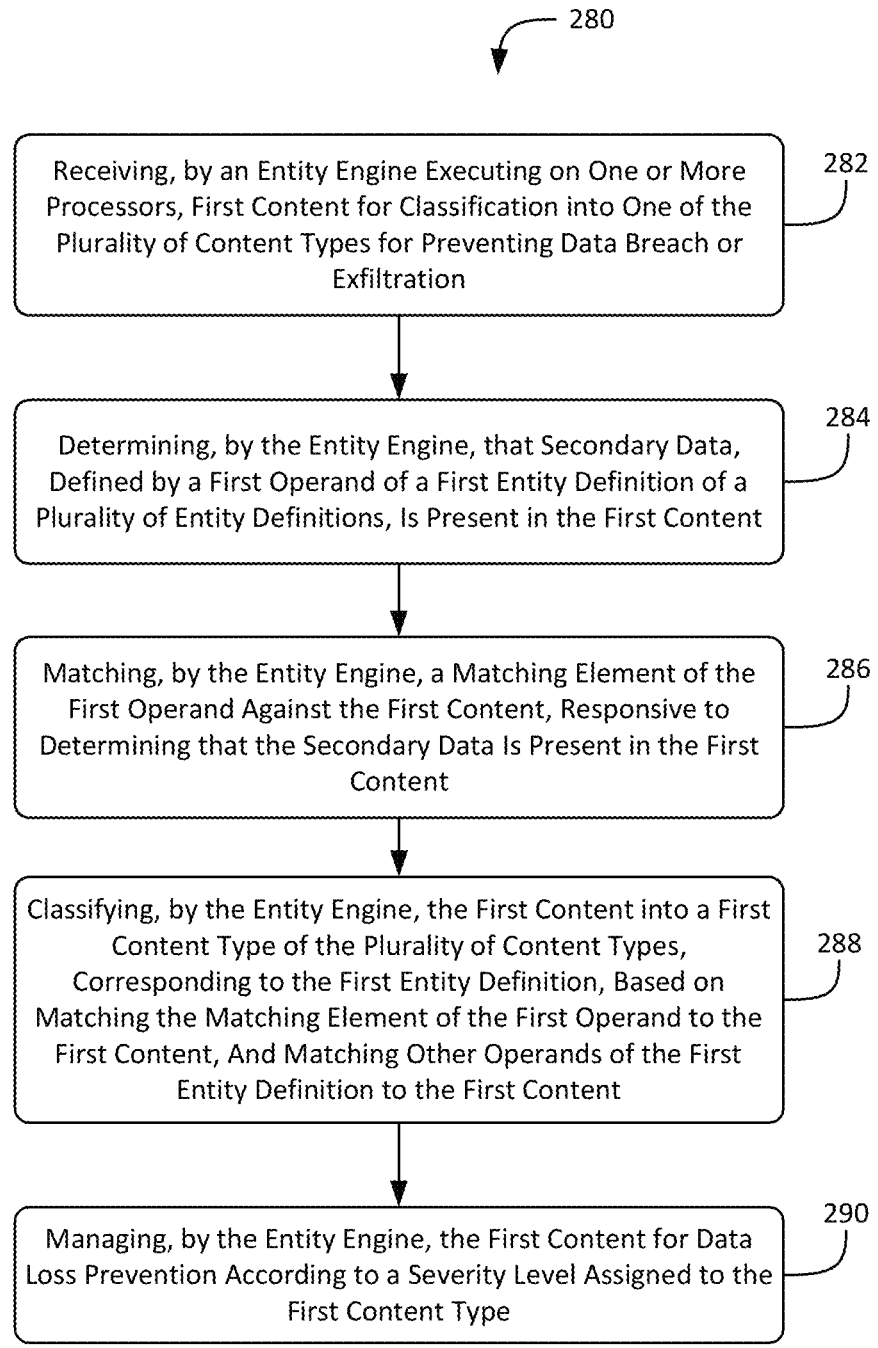
FIG. 2B is a flow diagram depicting an example embodiment of a method of classifying content to prevent data breach or exfiltration.

Referring now to FIG. 2B, an embodiment of a method 280 for classifying content to prevent data breach or exfiltration is depicted. The method 280 may performed or be executed by any one or more components of system 100 as described in conjunction with FIGS. 1A-1D or system 200 as described in conjunction with FIG. 2A such as the data indexer 240, the operand detector 245, the expression verifier 250, and/or the content classifier 255 of the entity engine 235. In brief overview, the method 280 may include receiving, by an entity engine executable on one or more processors, first content for classification into one of the plurality of content types for preventing data breach or exfiltration (282). The method 280 may include determining, by the entity engine, that secondary data, defined by a first operand of a first entity definition of a plurality of entity definitions, is present in the first content (284). The method 280 may include matching, by the entity engine, a matching element of the first operand against the first content, responsive to determining that the secondary data is present in the first content (286). The method 280 may include classifying, by the entity engine, the first content into a first content type of the plurality of content types, corresponding to the first entity definition, based on matching the matching element of the first operand to the first content, and matching other operands of the first entity definition to the first content (288). The method 280 may include managing, by the entity engine, the first content for data loss prevention according to a severity level assigned to the first content type (290).

Referring to (282), and in further detail, the method 280 may include receiving, by an entity engine executable on one or more processors, first content for classification into one of the plurality of content types for preventing data breach or exfiltration. The entity engine may access the content storage to identify the content. The first content may include one or more characters in the form of a string, some of which may correspond to sensitive or confidential information. The first content may correspond to the information on one or more files (e.g., document files, spreadsheet files, electronic emails, database files, image files, audio files, video files) stored within or otherwise accessible from the computing environment.

Referring to (284), and in further detail, the method 280 may include determining, by the entity engine, that secondary data, defined by a first operand of a first entity definition of a plurality of entity definitions, is present in the first content. Each entity definition of the plurality of entity definitions may correspond to one of a plurality of content types, and may include a Boolean expression of a plurality of operands. At least one operand of the plurality of operands (e.g., the first operand) may include a matching element to be used for matching against content undergoing classification into one of a plurality of content types, upon one or more secondary data defined by the at least one operand being present in the first content. The first operand itself corresponding to the specification that the secondary data is to be present in the content, may be the secondary data. The Boolean expression may specify a conjunction ("AND") between the first operand that may be the secondary data and another operand. In some embodiments, the same operand may specify the matching element to match against the content and the secondary data that should be present in the content. In some embodiments, some operands may specify the matching element to match against the content, without specifying that the secondary data that should be present in the content. The entity engine may compare the subsets of strings of characters forming the first content with the secondary data specified (e.g., by the first operand) for the first content type. The entity engine may match the information defining or specifying the secondary data to the subset of string of characters forming the first content. If none of the strings of characters of the first content is determined to match the secondary data, the entity engine may determine that the secondary data is not present in the first content. On the other hand, if at least one subset of strings of characters forming the first content is determined to match the secondary data of the first content type, the entity engine may determine that the secondary data is present in the first content.

Referring to (286), and in further detail, the method 280 may include matching, by the entity engine, a matching element of the first operand against the first content, responsive to determining that the secondary data is present in the first content. The entity engine may identify the one or more Boolean expressions, each having an operand defining secondary data that should be present in the first content. For each Boolean expression, the entity engine may then apply the operands of the Boolean expression to the first content. The entity engine may traverse through the string of characters forming the first content. The entity engine may also traverse through the remaining operands of each Boolean expression (for instance with one operand defining the secondary data that should be present in the first content). For each string of characters, the entity engine may determine whether there is a match between the string of characters and the matching element of the operand. Each time there is match, the entity engine may determine a matching score for the content type based on the weight specified for the operand corresponding to the match of the first content. In some embodiments, the entity engine may validate each subgroup of each string of characters forming the content. For each subgroup of each string of characters, the entity engine may validate the subgroup using a checksum algorithm and/or an error-detection code algorithm (e.g., Luhn algorithm) to validate the subgroup of each string of characters for the specified content type. The validation to be applied by the entity engine may be predefined by the Boolean expression.

Referring to (288), and in further detail, the method 280 may include classifying, by the entity engine, the first content into a first content type of the plurality of content types, corresponding to the first entity definition, based on matching the matching element of the first operand to the first content, and matching other operands of the first entity definition to the first content. If the strings of characters of the first content are determined not to match with all of the matching elements of the remaining operands as specified by the operators of the Boolean expression, the entity engine may determine not to classify the first content as the first content type. Conversely, if the strings of character of the first content are determined to match with all the remaining elements of the operands as specified by the operators of the Boolean expression, the entity engine may classify the first content into the first content type.

In some embodiments, the entity engine may classify the first content as belonging to the first content type based on the number of matches exceeding a minimum number of matches. In some embodiments, the entity engine may classify the first content into the first content type by comparing a matching score to the minimum threshold score specified by the Boolean expression for the content type. Between multiple matches, the entity engine may determine whether the first matching element of the first operand and a second matching element of the second operand are within a predefined proximity window. If the two matching elements are greater than the predefined proximity window, the entity engine may determine not to classify the first content into the first content type, or to provide a low matching score. If the two matching elements are less than or equal to the predefined proximity window, the entity engine may classify the first content into the first content type.

Referring to (290), and in further detail, the method 280 may include managing, by the entity engine, the first content for data loss prevention according to a severity level assigned to the first content type. The entity engine may manage the first content for data loss prevention to prevent data breach or exfiltration by the application in the computing environment. In some embodiments, the entity engine may assign a severity level to each content type of the entity definitions. The severity level may be predefined based on the content type. The severity level may also indicate a degree of sensitivity or confidentiality of the type of the information corresponding to the content type. The entity engine may perform a set of actions on the content for data loss prevention in accordance to the severity level of the content type to which the content is classified into. The set of actions may include warning the user of potential data breach (e.g., by displaying a prompt), blocking access of the content by the application, restricting exfiltration of the first content via the I/O control and/or the network interface, among other measures.

C. Systems and Methods for Identifying Personal Identifiers in Content to Prevent Data Breach or Exfiltration Described herein are systems and methods for classifying content to prevent data breach or exfiltration (e.g., opening, storing, downloading, uploading, movement). Various applications (e.g., web browsers, electronic mail applications, document processing applications, facsimile or printing applications, file/data transfer applications, and cloud storage applications), background system services (e.g., copy and paste operation, screenshot acquisition, and connection of removable computer storage), and/or other processes of a computing environment may attempt to access data. Such data may include document files, data strings, images, audio, or any other file format of data stored in the computing environment. A subset or constituent portion of the data may correspond to sensitive or confidential information, such as personal or security identifiers (e.g., account identifier, phone numbers, license plate numbers, birthdate, credit card numbers).

Such information may be identified as sensitive or confidential on a word-by-word or a phrase-by-phrase comparison with entries of a dictionary. The dictionary may include a large set of words or phrases marked as sensitive or confidential. Each entry may include a template of the word to account for slight variations (e.g., spacing, capitalization, plural form). Each word of a file may be compared against all the entries of the dictionary to determine whether the file contains sensitive or confidential information, such as personal identifiers. Without incorporating context or using other logic, however, such techniques may be inaccurate and may result in false positives for data breach/exfiltration/misuse. Thus many of the data breaches and exfiltration attempts by or using applications from the computing environment may be carried out undetected.

To increase the accuracy of identifying data as containing classified or sensitive information, an entity engine executing in the computing environment may classify content into various content types by applying a set of predefined entity definitions. Each entity definition may include a combination of a regular expression, a set of terms, and/or a set of dictionary entries, among others for a particular content type (e.g., account identifier, phone numbers, license plate numbers, birthdate, credit card numbers).

Using the set of predefined entity definitions, the entity engine may classify the content into one of various content types, e.g., types of personal identifiers. In one embodiment, the entity engine may access memory of the computing environment to obtain content accessible by applications and/or users for classification. For each entity definition of the corresponding content type, the entity engine may determine whether there is secondary data present in the content, e.g., a geographic or linguistic term correlated to a predefined type of personal identifier, the secondary data specified by the regular expression (e.g., in an operand) of the entity definition. When the content is determined to have the secondary data, the entity engine may then apply the operand(s) of the regular expression to the content to match with the elements of the expression. Each element may be within a predefined proximity window for there to be a match. With each match, the entity engine may assign a weight or score. If the content is determined to have a match with all the elements/operands of the regular expression, the entity engine may classify the content into the corresponding content type with the determined score for the content type.

Additionally, to further increase the accuracy of identifying data as containing classified or sensitive information, each of the set of predefined entity definitions may also specify a data format for finding a particular type of personal identifier that may correspond to confidential or sensitive information (e.g., Social Security numbers, credit card numbers, addresses, e-mail addresses, phone numbers). The entity definition may also specify a rule for finding a geographic term or a linguistic term correlated to the specific type of personal identifier. The geographic term may be a name of a geographic region or any identifier associated with the geographic region, such as a physical address, email address, a telephone number, a postal code, a continent, a town name, a provincial name, and county name, among others. The linguistic term may be any set of alphanumeric characters, such as a word, expression, or any phrase relating to a particular formal or a natural language. The presence of the geographic and linguistic term in the content in conjunction with string matching the data format specified by the entity definition may be indicative of the existence of a personal identifier in the content.

With the set of predefined entity definitions specifying the data formats for finding particular types of personal identifiers, the entity engine may classify text string in the content as having one of the types of personal identifiers. The entity engine may parse the content to obtain a set of text strings. For each entity definition, the entity engine may determine whether a text string in the content matches the specified data format for the particular type of personal identifier. If the text string is determined to match the specified data format, the entity engine may identify a geographic term or a linguistic term correlated to the specific type of personal identifier in the text string of the content in accordance to the rule of the entity definition. The entity engine may assign a score for the type of personal identifier based on the match between the text string and the specified data format, and/or the identification of the geographic term or linguistic term of the rule in the text string. The entity engine may also identify a descriptive term for the particular type of identifier in the text string. The entity engine may determine whether the descriptive term is within a proximity window of the text string matching the data format, and assign the score based the determination of whether the descriptive term is within the proximity window. Based on the scoring for the particular type of personal identifier, the entity engine may classify the text string of the content as the personal identifier.

In comparison to the word-by-word dictionary approach, for instance, the use of the set of the predefined entity definitions in this manner may result in higher accuracy in identifying sensitive or confidential information contained in content. Moreover, the application of the operands upon determination of the presence of corresponding secondary data within the content may lead to lower false positives. Once the content has been classified to have a content type identified as containing sensitive or confidential information, the entity engine may for example identify activities corresponding to the data type, that are considered to be unauthorized or relate to data misuse/breach/exfiltration, and can prevent such unauthorized access or exfiltration of the content by any user or application running in the computing environment.

Figure 3A:
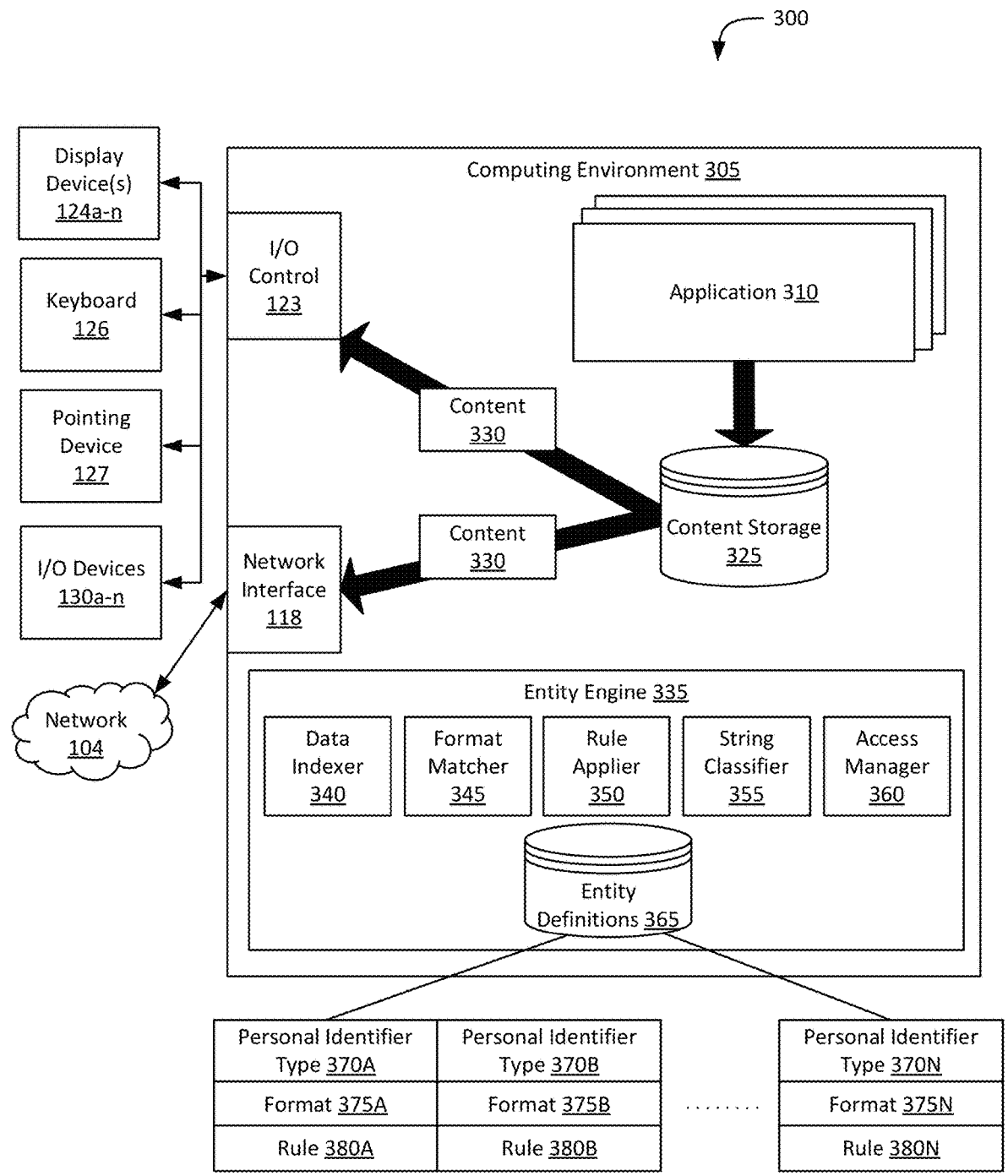
FIG. 3A is a block diagram depicting an example embodiment of a system for identifying personal identifiers in content to prevent data breach or exfiltration.

Referring now to FIG. 3A, an embodiment of a system 300 for classifying content to prevent data breach or exfiltration or misuse is depicted. In brief overview, the system 300 may include a computing environment 305. The computing environment 305 may correspond to the computing device 100 as described in FIGS. 1C and/or 1D, and may include an application 310, a content storage 325, and/or an entity engine 335 which can interact with the network interface 118 and/or I/O control 123. The application 310 may comprise any type or form of software, script or program, such as a background system service or program. The content storage 325 may include or store content 330. The entity engine 335 may include a data indexer 340, a format matcher 345, a rule applier 350, a string classifier 355, an access manager 360 and/or a dataset of entity definitions 365. The database of the entity definitions 365 may be stored on memory of the computing environment 305. The entity engine 335 may correspond to or be adapted from entity engine 235, and may include certain embodiments of features and/or functionalities described above in connection with FIG. 2A for instance.

Each of the above-mentioned elements or entities (e.g., application 310, content storage 325, content 330, and entity engine 335 and its components) is implemented in hardware, or a combination of hardware and software, in one or more embodiments. For instance, each of these elements or entities could include any application, program, library, script, task, service, process or any type and form of executable instructions executing on hardware of the system, in one or more embodiments. The hardware includes circuitry such as one or more processors, for example, as described above in connection with FIGS. 1A-1D, in some embodiments, as detailed in section A.

In an attempt to access and/or transfer data from the computing environment 305, a user and/or an application 310 may perform an unauthorized or potentially risky access of the content storage 325. The application 310 may be any type of executable running on the computing environment 305, such as a cloud-synchronization application, an electronic mail application, a word processor application, a document-rendering application, a data transfer application, a data copying application, a facsimile application, or a printing application, among others. The attempt to perform the unauthorized access by the application 310 may be triggered by any selection of the graphical user interface elements, an invocation of an API function call, or otherwise another action/routine directly or indirectly initiated by the application 310, by multiple applications or by a user.

The attempt at an unpermitted or risky transfer of content 330 (e.g., stored on the content storage 325) from/within/to the computing environment 305 by the user or application 310. For instance, there may be an attempt to move or place sensitive data into a location which is not secured. And by way of example, a transfer of content from the computing environment 305 may occur in at least two ways. The application 310 may attempt to transfer the content 330 to the network interface 118 to transmit the content 330 via the network 104 to another computing device. The application 310 may attempt to transfer the content 330 to the I/O control 123 to output the content 330 on one of the I/O devices 130a-n, the display devices 124a-n, or another computer readable storage medium connected to the computing environment 305. An I/O device may include for instance a printer or fax machine, a flash drive or other peripheral/storage device that can receive files, an I/O interface to send files to a network or another device, or a user-input device (e.g., keyboard with print key) that can be used to perform or facilitate data movement. In some embodiments, the computing environment 305 may be used to transfer data from/via the network 104 to one or more I/O devices (e.g., an illegal or restricted destination or storage location). The I/O device can refer to software and/or hardware, for instance software that does the data exfiltration or movement (e.g., the web browser, the application), and/or the destination of the exfiltrated data.

To identify content 330 accessible by the user or application 310 as containing sensitive or confidential information, the data indexer 340 may receive content 330 for classification, e.g., for preventing data breach or exfiltration. In some embodiments, the data indexer 340 may access the content storage 325 to identify the content 330. Each content 330 may include one or more characters in the form of a set of characters or a text string, some of which may correspond to sensitive or confidential information. The content storage 325 may correspond to one or more directories maintaining, storing or otherwise including the content 330. Each content 330 may correspond to the information on one or more files (e.g., document files, spreadsheet files, electronic emails, database files, image files, audio files, video files) stored within or otherwise accessible from the computing environment 305. Each content 330 may be stored on the storage 128, main memory 122, cache memory 140, I/O devices 130a-n, or any other computer readable storage medium connected to or within the computing environment 305. In some embodiments, the content 330 may span over multiple files stored on the computing environment 305. The one or more files including the content 330 of the content storage 325 may have one or more attributes. Each file may be associated with a residing location. The residing location may be a file pathname that may indicate a drive letter, volume, server name, root directory, sub-directory, file name, and/or extension among others. Each file may be associated with an owner indicated using a user identifier (e.g., username, screen name, account identifier, electronic mail address) for example. Each file may be associated with a source or author. Each file may be associated with a file type. Each file may be associated with a file system permission specifying ability to read, write, and execute for different applications 310 and users of the computing environment 305. References to file(s) herein are merely illustrative, and not intended to be limiting. For instance, instead of a file with the above-discussed characteristics/properties, a content segment or other collection, unit or aggregate of data/content having similar characteristics/properties are contemplated.

Once the content 330 (or data) accessible by the application 310 is identified, the entity definitions 365 stored in the database may be used to classify the content 330. The entity definitions 365 may be stored and maintained at the database using a data structure, such as an array, a matrix, a table, a linked list, a heap, a hash map, a binary tree, and a skip list, among others. In some embodiments, the entity definitions 365 may be expressed or specified using Extensible Markup Language (XML). Each entity definition may correspond to one of multiple personal identifier types 370A-N (hereinafter generally referred to as personal identifier type 370). The personal identifier types 370 may include, for example, vehicle license plates, vehicle identification number, state identification numbers, passport numbers, driver license numbers, physical addresses, e-mail addresses, phone numbers, Social Security numbers, state social insurance numbers, personal identification numbers, bank account numbers, credit card numbers, health insurance identification numbers, military service numbers, and product serial codes, among others. Other text strings in the content 330 may be indicative of occurrence of the personal identifier type 370 within the same content 330.

Each personal identifier type 370 may specify a data format 375A-N (hereinafter generally referred to as data format type 375). The data format 375 may include a template or a pattern for the text string of the content 330 for the corresponding personal identifier type 370. For example, the template for a U.S. Social Security number as the personal identifier type 370 may specify "xxx-xx-xxxx", where "x" corresponds to a numerical value and "-" is a hyphen or delimiter. In some embodiments, the template or the pattern of the data format 375 may specify subsets of characters as subcomponents of the personal identifier type 370. The subcomponent may specify a set of valid characters at a corresponding position in the template or the pattern for the data format 375. For example, the template for a phone number as the personal identifier type 370 may be "(xxx) xxx-xxxx." The template may specify that the first three "x" corresponds to a numerical value for an area code, the second three "x" corresponds to a prefix, and a third four "x" corresponds to a postfix. In this example, the template may specify that "(" and ")" as the parentheses for the area code between the parentheses and "-" is a hyphen or delimiter. In some embodiments, the data format 375 may specify multiple templates for the respective personal identifier type 370.

In addition, each personal identifier type 370 may further specify a rule 380A-N (hereinafter generally referred to as rule 380). The rule 380 may further specify any descriptive term or identifying term in the content 330 correlated to the personal identifier type 370. The presence of any such descriptive or identifying terms in the content 330 may be correlated with the text string in the same content 330 corresponding to the personal identifier type 370. The descriptive term or identifying term of the rule 380 correlated to the personal identifier type 370 may include a geographic term, a linguistic term, or any other term indicative of the personal identifier type 370. In some embodiments, the descriptive or identifying term may be part of an entry in a dictionary of words or a list of set of characters for the rule 380 specified for the personal identifier type 370. In some embodiments, the rule 380 may specify a level of correlation between the descriptive or identifying term and the personal identifier type. The level of correlation may be a numerical value (e.g., a multiplicative weight) representative of the correlation. The level of correlation with the personal identifier type 370 may differ depending on the descriptive or identifying term, as certain terms may be more indicative than others of the personal identifier type 370. In some embodiments, the rule 380 may specify that the descriptive or identifying term is to be within a predefined level of proximity to the text string in the content 330. The predefined level of proximity may specify a number of characters or text strings in the content 330 within which the text string corresponding to the personal identifier type 370 and the descriptive or identifying term are to occur. In some embodiments, the rule 380 may also specify a predefined sequential order that the text string corresponding to the personal identifier type 370 and the descriptive or identifying term are to occur in the content 330. In some embodiments, multiple personal identifier types 370 may specify the same rule 380 to classify the text string in the content 330 as one of the personal identifier types 370.

The rule 380 may specify the geographic term in the content 330 correlated with or to the personal identifier type 370. The geographic term may for instance be identified or predetermined to be highly/closely/commonly related to or associated with the type of personal identifier 370. The level of the correlation (or association/relatedness) may have to exceed a predetermined level, to be considered correlated. A level of correlation may be determined according to a number of aspects, including frequency of the term, proximity to the personal identifier in the content, and/or score(s) assigned to the geographic term (e.g., via statistical/historical analysis) that represent strength of association with a particular type of personal identifier. The presence of certain geographic terms in the content 330 may be correlated with the text string in the same content 330 corresponding to the personal identifier type 370. For example, a U.S. Social Security number as the personal identifier type 370 may be correlated with the occurrence of place names associated with the U.S. in the content 330. The geographic term may include a name or identifier of a geographic region (e.g., "California", "Calif", or "CA"). In some embodiments, the geographic term may include a set of characters and/or words associated with the geographic region, such as: a name of an entity located in or associated with the geographic region (e.g., "Death Valley", "UC Santa Cruz", or "Santa Clara Valley"), an address of the geographic region, a physical address located in or associated with the geographic region, an e-mail address (e.g., info@ca.gov) of an entity located in or associated with the geographic region, and/or a telephone number of an entity located in or associated with the geographic region, among others. In some embodiments, the name or the identifier of the geographic region may include: a postal code (e.g., ZIP code "90210"); a name or identifier of a place, state, census area, county, township, town, village, borough, parish, municipality, city, country or continent; and/or a name or identifier of a geological, cultural, historical or linguistic feature of the geographic region, among others. In some embodiments, the rule 380 may specify that the geographic term be (or not be) in a particular language or used (or nor used) with a particular language. For instance, the rule 380 may specify that a geographic term should be expressed in a language native to the corresponding geographic region, or should be expressed in a language other than English.

The rule 380 may also specify the linguistic term in the content 330 correlated to the personal identifier type 370. The linguistic term may for instance be identified or predetermined to be highly/closely/commonly related to or associated with the type of personal identifier 370. The level of the correlation (or association/relatedness) may have to exceed a predetermined or specified level, to be considered correlated. A level of correlation may be determined according to a number of aspects, including frequency of the term, proximity to the personal identifier in the content, and/or score(s) assigned to the linguistic term (e.g., via statistical/historical analysis) that represent strength of association with a particular type of personal identifier. The presence of certain linguistic terms in the content 330 may be correlated with the text string in the same content 330 corresponding to the personal identifier type 370. For example, a German driver license number as the personal identifier type 370 may be correlated with the occurrence of various terms in German (e.g., "Führerschein") in the content 330. The linguistic term may include a word, an expression, or a reference, among others, and determined to be linguistically significant relative to a specific language. For example, the linguistic term "daß" may indicate that the content 330 includes words in German, "c'est" may indicate that the content 330 includes words in French, and "então" may indicate that the content 330 includes words in Portuguese, among others. The word, the expression, or the reference for the linguistic term may include any set of alphanumeric characters, such as a letter, a character, a grapheme, a glyph (e.g., a diacritical mark), a ligature, a numeric digit, and/or a punctuation mark, among others, determined to be linguistically significant with respect to a specific language. The word, the expression, or the reference may be associated with a particular/identified spoken language, written language (or formal language), culture, dialect (or colloquialisms), and/or jargon (or technical language), among others. In some embodiments, the rule 380 may specify that the linguistic term should reference or be used with a particular geographic region/term, and/or be consistent with a context of a specific personal identifier. For instance, the rule 380 may specify that the linguistic term be from a language native to a geographic region that uses a specified type personal identifier, and/or that the linguistic term be commonly used with the specified type personal identifier.

Using the entity definitions 365 in the database, the format matcher 345 may determine whether a text string in the content 330 matches to a data format 375 specified by one of the entity definitions 365 for the personal identifier type 370. In some embodiments, the format matcher 345 may parse the content 330 to identify one or more text strings. Each text string may correspond to one or more characters in the content 330. In some embodiments, each text string may correspond to a set of characters separated from other sets of characters by spaces (" ") in the content 330. In some embodiments, the format matcher 345 may identify an n-gram sets of words in the content 330. Each word may be separated from another word by a space in the content 330. Each text string may correspond to the n-gram sets of characters (or words) in the content 330. Each n-gram corresponding to the respective text string may include a sequence of n number of contiguous words extracted from the content 330. The format matcher 345 may traverse through the text strings identified from the content 330. Concurrently or separately, the format matcher 345 may also traverse through the data formats 375 of the corresponding personal identifier types 370. For each data format 375, the format matcher 345 may compare each text string identified from the content 330 with the template or the pattern specified by the data format 375 for the personal identifier type 370.

In comparing the text string of the content 330, the format matcher 345 may determine whether one or more characters of the text string (which can include one or more delimiters) match the subcomponents of the template or the pattern of the data format 375 specified for the personal identifier type 370. If none of the characters are determined to not match any of the subcomponents of the template or the pattern, the format matcher 345 may identify or skip to the next text string and repeat the comparison. After traversing all the text strings in the content 330, if none of the text strings are determined to match the template or the pattern, the format matcher 345 may determine that the content 330 does not include any text strings that match the personal identifier type 370. If all the characters in the text string are determined to match all the subcomponents of the template or the pattern, the format matcher 345 may determine that the text string matches the data format 375 for the personal identifier type 370. In some embodiments, the format matcher 345 may also continue to repeat the comparison for other personal identifier types 370 of the entity definitions 365 stored at the database. The content 330 may be determined by the format matcher 345 to include one or more text strings that match multiple personal identifier types.

Based on determining a match between the text string (e.g., via the data format 375) and the personal identifier type 370, the format matcher 345 may assign a score for classifying the text string as the personal identifier type 370. The score may be any numerical value, and may range from 0 to 1, −1 to 1, 0 to 10, −10 to 10, and −100 to 100, or any other range of value. The score may also be indicative of a likelihood that the text string corresponds to the personal identifier type 370. In some embodiments, the format matcher 345 may assign an initial score for classifying the text string as the personal identifier type 370. In some embodiments, the initial score may be a starting numerical value that may be adjusted in the manner detailed below.

In response to determining that at least one of the text strings in the content 330 matches one of the data formats 375 specified for the personal identifier type 370, the rule applier 350 may find a descriptive term or an identifying term for the personal identifier type 370 in the content 330 in accordance with the rule 380. As described above, the presence of any such descriptive or identifying terms specified by the rule 380 in the content 330 may be correlated with the text string in the same content 330 corresponding to the respective personal identifier type 370. The descriptive or identifying term of the rule 380 may include a geographic term, a linguistic term, and/or any other set of predefined terms, among others. For the entity definition 365 of the personal identifier type 370, the rule applier 350 may access the database to identify the descriptive or identifying term of the rule 380 for the personal identifier type 370. The rule applier 350 may traverse through the other text strings of the content 330 to find the descriptive or identifying term from the content 330 in accordance with the rule 380. In some embodiments, the traversal of the content 330 may be limited to the text strings within the predefined level of proximity specified by the rule 380. In some embodiments, the rule applier 350 may determine that the text string from the remainder of the content 330 matches the descriptive or identifier term based on a match with at least one entry in the dictionary of words for the rule 380. The match may be exact or substantially similar to account for minor variations of spelling or typographical errors (e.g., "UC Santa Cruz" versus "University of California Santa Cruz"). In traversing through the text strings of the content 330, the rule applier 350 may identify a geographic term or a linguistic term correlated with the personal identifier type 370 in the content 330 in accordance with the rule 380.

Upon finding at least one descriptive or identifying term in the content 330 in accordance with the rule 380, the rule applier 350 may adjust the score for classifying the text string as the personal identifier type 370. In some embodiments, in response to the finding, the rule applier 350 may identify a level of correlation for the descriptive or identifying term specified by the rule 380. As described above, the level of correlation with the personal identifier type 370 may differ depending on the descriptive or identifying term, as certain terms may be more indicative than others of the personal identifier type 370. The rule applier 350 may increase the score for classifying the text string as the personal identifier type 370 based on the level of correlation for the descriptive or identifying term. In some embodiments, the rule applier 350 may increase the score by applying the multiplicative weight corresponding to the level of correlation for the descriptive or identifying term. In some embodiments, the rule applier 350 may determine a distance between the text string matching the data format 375 and the descriptive or identifying term in the content 330. The distance may be a number of characters or words between the text string and the descriptive or identifying term in the content 330. The rule applier 350 may adjust the score for classifying the text string as the personal identifier type 370 based on the distance.

Having found the at least one descriptive or identifying term in the content 330 in conjunction with the determination that at least one text string matches the data format 375 for the personal identifier type 370, the string classifier 355 may classify the text string in the content 330 as the personal identifier type 370. If none of the text strings in the content 330 are determined to match the template or the pattern specified by the data format 375, the string classifier 355 may determine that the content 330 does not include any text strings that are to be classified with any of the personal identifier types 370. On the other hand, with multiple matches between one or more text strings of the content 330 with the data formats 375 specified for various personal identifier types 370, the string classifier 355 may classify the text string of the content 330 to one or more of the personal identifier types 370 based on the determined scores. In some embodiments, the string classifier 355 may classify the text string to one of the personal identifier types 370 based on the score. The string classifier 355 may identify the highest score for the personal identifier type 370, and may classify the text string as the personal identifier type 370 corresponding to the text string having highest score for instance. The string classifier 355 may classify the text string as the personal identifier type 370 if the corresponding score or highest score is above a predefined threshold score, e.g., for the personal identifier type 370. In some embodiments, the string classifier 355 may classify the text strings of the content 330 to multiple personal identifier types 370. For each personal identifier type 370 with a match to one of the text strings in the content 330, the string classifier 355 may compare the score for the personal identifier type 370 to a predetermined threshold score. The predetermined threshold score may be set to a numerical value greater than the initial score for the personal identifier type 370. If the score for the personal identifier type 370 is determined to be greater than or equal to the predetermined threshold score, the string classifier 355 may classify the corresponding text string as the personal identifier type 370. Conversely, if the score for the personal identifier type 370 is determined to be less than the predetermined threshold score, the string classifier 355 may determine that the text string is not to be classified as the personal identifier type 370. In this manner, the content 330 may be determined to have text strings with potentially multiple personal identifier type 370 classifications.

In some embodiments, the string classifier 355 may determine a distance between the text string matching the data format 375 and the descriptive or identifying term in the content 330. The distance may be a number of characters or words between the text string and the descriptive or identifying term in the content 330. The string classifier 355 may compare the distance with the predefined level of proximity specified by the rule 380 for the personal identifier type 370. If the distance is determined to be greater than or equal to the predefined level of proximity, the string classifier 355 may determine that the text string of the content 330 is not to be classified as the personal identifier type 370. Conversely, if the score for the personal identifier type 370 is determined to be less than the predefined level of proximity, the string classifier 355 may classify the text string as the personal identifier 370. In some embodiments, once the distance is determined to be less than the predefined level of proximity, the string classifier 355 may compare the score for the personal identifier type 370 to the predetermined threshold score in the manner described above.

In some embodiments, the string classifier 355 may determine an order of the text string matching the data format 375 and the descriptive or identifying term in the content 330. The order may be one of: the text string preceding the descriptive or identifying term and the text string subsequent to the descriptive or identifying term. The string classifier 355 may compare the determined order to the predefined sequential order specified by the rule 380 for the personal identifier type 370. If the determined order does not match the predefined sequential order of the rule 380, the string classifier 355 may determine that the text string of the content 330 is not to be classified as the personal identifier type 370. On the other hand, if the determined order matches the predefined sequential order of the rule 380, the string classifier 355 may classify the text string as the personal identifier 370. In some embodiments, once the distance is determined to be less than the predefined level of proximity, the string classifier 355 may compare the score for the personal identifier type 370 to the predetermined threshold score in the manner described above.

Upon classifying the content 330 as one of the personal identifier types 370 using the entity definitions 365, the access manager 360 may manage the content 330 for data loss prevention to prevent data breach or exfiltration by the application 310 in the computing environment 305. In some embodiments, the access manager 360 may assign a severity level to each personal identifier type 370 of the entity definitions stored in the database 365. The severity level may be predefined based on the personal identifier type 370, and may be a numerical value. The severity level may also indicate a degree of sensitivity or confidentiality of the type of the information corresponding to the personal identifier type 370. In some embodiments, the access manager 360 may perform a set of actions on the content 330 for data loss prevention in accordance to the severity level of the personal identifier type 370 to which the content 330 is classified into. The set of actions may include warning the user of potential data breach (e.g., by displaying a prompt), blocking access of the content 330 by the application 310, restricting exfiltration of the content 330 via the I/O control 123 and/or the network interface 118, among other measures.

Figure 3B:
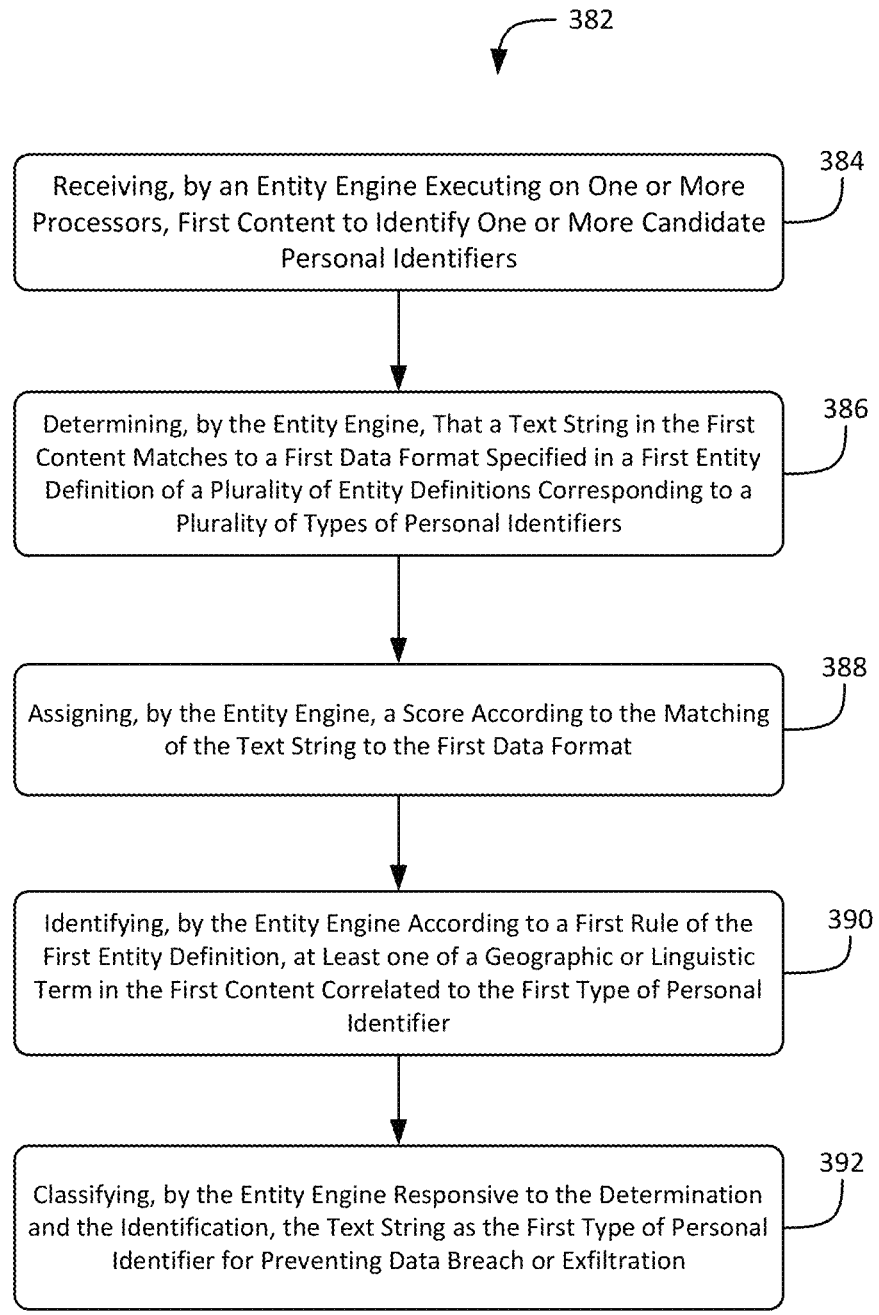
FIG. 3B is a flow diagram depicting an example embodiment of a method of identifying personal identifiers in content to prevent data breach or exfiltration.

Referring now to FIG. 3B, an embodiment of a method 382 for classifying content to prevent data breach or exfiltration is depicted. The method 382 may performed or be executed by any one or more components of system 100 as described in conjunction with FIGS. 1A-1D or system 300 as described in conjunction with FIG. 3A such as the data indexer 340, the format matcher 345, the rule applier 350, the string classifier 355, and/or the access manager 360 of the entity engine 335. In brief overview, the method 382 may include receiving, by an entity engine executing on one or more processors, first content to identify one or more candidate personal identifiers (384). The method 382 may include determining, by the entity engine, that a text string in the first content matches to a first data format specified in a first entity definition of a plurality of entity definitions corresponding to a plurality of types of personal identifiers (384). The method 382 may include assigning, by the entity engine, a score according to the matching of the text string to the first data format (386). The method 382 may include identifying, by the entity engine according to a first rule of the first entity definition, at least one of a geographic or linguistic term in the first content correlated to the first type of personal identifier (388). The method 382 may include classifying, by the entity engine responsive to the determination and the identification, the text string as the first type of personal identifier for preventing data breach or exfiltration (390).

Referring to (384), and in further detail, the method 382 may the method 382 may include receiving, by an entity engine executing on one or more processors, first content to identify one or more candidate personal identifiers. The entity engine may access the content storage or a data stream to identify the content. The first content may include one or more text strings, some of which may correspond to sensitive or confidential information. The first content may correspond to the information on one or more files (e.g., document files, spreadsheet files, electronic emails, database files, image files, audio files, video files) stored within or otherwise accessible from the computing environment. The entity engine may parse the content to identify the one or more text strings for classification.

Referring to (386), and in further detail, the method 382 may include determining, by the entity engine, that a text string in the first content matches to a first data format specified in a first entity definition of a plurality of entity definitions corresponding to a plurality of types of personal identifiers. Each entity definition may specify a data format for finding a specific type of personal identifier in content. The first data format may include a template or a pattern for the text string of the first content for the corresponding type of personal identifier. The entity engine may compare the first text string with the template or the pattern specified by the first data for the first type of personal identifier. In comparing, the entity engine may compare each character of the first text string with the corresponding index on the template or the pattern to determine the match. If all the characters in the first text string are determined to match the template or the pattern, the entity engine may determine that the first text string matches the first data format for the first type of personal identifier. Otherwise, if any of the characters of the first text string are determined not to match, the entity engine may determine that the first text string does not match the first data format for the first type of personal identifier.

Referring to (388), and in further detail, the method 382 may include assigning, by the entity engine, a score according to the matching of the text string to the first data format. Based on determining the match between the first text string and the first type of personal identifier, the entity engine may assign a score for classifying the first text string as the first type of personal identifier. The score may be any numerical value, and may also be indicative of a likelihood that the first text string corresponds to the first type of personal identifier. The entity engine may assign an initial score for classifying the first text string as the first type of personal identifier.

Referring to (390), and in further detail, the method 382 may include identifying, by the entity engine according to a first rule of the first entity definition, at least one of a geographic or linguistic term in the first content correlated to the first type of personal identifier. The first entity definition may include the first rule for finding at least one of a geographic or linguistic term in the content correlated to the first type of personal identifier. The first rule may specify one or more descriptive terms or identifying terms (e.g., a geographic or linguistic term) in the first content correlated to the first type of personal identifier. The geographic term may include a name or identifier of a geographic region. In some embodiments, the geographic term may include a set of characters and/or words associated with the geographic region, such as: a name of an entity located in or associated with the geographic region, an address of the geographic region, a physical address located in or associated with the geographic region, an e-mail address of an entity located in or associated with the geographic region, and/or a telephone number of an entity located in or associated with the geographic region, among others. In some embodiments, the name or the identifier of the geographic region may include: a postal code; a name or identifier of a place, state, census area, county, township, town, village, borough, parish, municipality, city, country or continent; and/or a name or identifier of a geological, cultural, historical or linguistic feature of the geographic region, among others. The linguistic term may include a word, an expression, or a reference, among others, and determined to be linguistically significant relative to a specific language. The word, the expression, or the reference for the linguistic term may include any set of alphanumeric characters, such as a letter, a character, a grapheme, a glyph, a ligature, a numeric digit, and/or a punctuation mark, among others, determined to be linguistically significant with respect to a specific language. The word, the expression, or the reference may be associated with a particular/identified spoken language, written language (or formal language), culture, dialect (or colloquialisms), and/or jargon (or technical language), among others. In some embodiments, the descriptive term or identifying term may be specified by a dictionary of words for the first rule. The entity engine may traverse through the first content to find the geographic term, the linguistic term, and/or other descriptive term correlated to the first type of personal identifier.

In response to finding the geographic term, the linguistic term, and/or other descriptive term, the entity engine may adjust or update the score (e.g., from the initial score) for the first type of personal identifier. The adjustment may be based on a level of correlation for the geographic term, the linguistic term, and/or other descriptive term specified by the first rule. The level of correlation with the first type of personal identifier may differ depending on the descriptive or identifying term, as certain geographic, linguistic, or other terms may be more indicative than others of the first type of personal identifier. The entity engine may increase the score for classifying the text string as the first type of personal identifier based on the level of correlation for the descriptive or identifying term (e.g., geographic or linguistic term).

The method 382 may include classifying, by the entity engine responsive to the determination and the identification, the text string as the first type of personal identifier for preventing data breach or exfiltration (392). The entity engine may compare the score for the first type of personal identifier to a predetermined threshold score. The predetermined threshold score may be greater than the initial score for classification for the first type of personal identifier. If the score for the first type of personal identifier is determined to be greater than or equal to the predetermined threshold score, the entity engine may determine that the first text string is to be classified as the first type of personal identifier. On the other hand, if the score for the first type of personal identifier is determined to be less than the predetermined threshold score, the entity engine may determine that the first text string is not to be classified as the first type of personal identifier.

In some embodiments, the entity engine may determine a distance between the text string matching the first data format and the descriptive or identifying term in the content. The distance may be a number of characters or words between the text string and the descriptive or identifying term in the content. The entity engine may compare the distance with the predefined level of proximity specified by the first rule for the first type of personal identifier. If the distance is determined to be greater than or equal to the predefined level of proximity, the entity engine may determine that the first text string of the content is not to be classified as the first type of personal identifier. Conversely, if the score for the first type of personal identifier is determined to be less than the predefined level of proximity, the entity engine may classify the text string as the first type of personal identifier. In some embodiments, once the distance is determined to be less than the predefined level of proximity, the entity may compare the score for the first type of personal identifier to the predetermined threshold score in the manner described above.

In some embodiments, the entity engine may manage the first content for data loss prevention to prevent data breach or exfiltration by the application in the computing environment. In some embodiments, the entity engine may assign a severity level to each type of personal identifier of the entity definitions. The severity level may be predefined based on the type of personal identifier. The severity level may also indicate a degree of sensitivity or confidentiality of the type of the information corresponding to the type of personal identifier. The entity engine may perform a set of actions on the content for data loss prevention in accordance to the severity level of the type of personal identifier to which the content is classified into. The set of actions may include warning the user of potential data breach (e.g., by displaying a prompt), blocking access of the content by the application, restricting exfiltration of the first content via the I/O control and/or the network interface, among other measures.

The description herein including modules emphasizes the structural independence of the aspects of the entity engine, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Non-limiting examples of various embodiments are disclosed herein. Features from one embodiments disclosed herein may be combined with features of another embodiment disclosed herein as someone of ordinary skill in the art would understand.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of"

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A system for identifying a personal identifier in content, the system comprising:
   memory configured to store a plurality of entity definitions corresponding to a plurality of types of personal identifiers, each entity definition specifying a corresponding data format for finding a respective type of personal identifier in content, and a rule, wherein the rule specifies:
   (i) a corresponding level of correlation for at least one of a respective geographic or linguistic term in the content with the respective type of personal identifier for the corresponding data format, wherein the corresponding level of correlation comprises a weight representative of the correlation between the respective type of personal identifier and the at least one of the respective geographic or linguistic term, and
   (ii) a corresponding threshold level where, when the weight exceeds the corresponding threshold level, the data format is classified as the respective type of personal identifier; and
   an entity engine executable on one or more processors, the entity engine configured to:
   receive first content to identify one or more candidate personal identifiers;
   compare a text string in the first content and a text string in a first data format specified in a first entity definition of the plurality of entity definitions, the first data format corresponding to a first type of personal identifier from the plurality of types of personal identifiers;
   determine a distance between the text string and the first data format;
   determine that the text string in the first content matches the first data format based on the distance; and
   classify, responsive to the determination, the text string as the first type of personal identifier for preventing data breach or exfiltration.

2. The system of claim 1, wherein the entity engine is further configured to find an identifying or descriptive term for the first type of personal identifier, in the first content, and to classify the text string as the first type of personal identifier responsive to finding the identifying or descriptive term in the first content.

3. The system of claim 2, wherein the entity engine is further configured to find the identifying or descriptive term located within a predefined level of proximity to the text string in the content.

4. The system of claim 1, wherein the entity engine is further configured to:
- determine a score based on the distance between the text string and the first data format, wherein the score increases as the distance between the text string and the first data format decreases;
- identify a first level of correlation specified by a first rule of the first entity definition for at least one of a geographic or linguistic term in the first content with the first type of personal identifier;
- identify a first threshold level specified by the first rule of the first entity definition corresponding to the first type of personal identifier;
- determine that the first level of correlation satisfies the first threshold level specified by the first rule for the first type of personal identifier; and
- classify, responsive to the determination and the identification, the text string as the first type of personal identifier for preventing data breach or exfiltration.

5. The system of claim 4, wherein the entity engine is further configured to increase the score by an amount according to the identified at least one of a geographic or linguistic term in the first content correlated to the first type of personal identifier.

6. The system of claim 4, wherein the entity engine is further configured to increase the score by an amount according to the level of correlation between the identified at least one of a geographic or linguistic term, and the first type of personal identifier.

7. The system of claim 4, wherein the score is indicative of a likelihood that the text string actually is a personal identifier of the first type.

8. The system of claim 4, wherein the geographic term comprises a name or identifier of a geographic region, a name of an entity located in or associated with the geographic region, an address of the geographic region, or a physical address, email address or telephone number of an entity located in or associated with the geographic region, wherein the name or identifier of a geographic region comprises one or more of: a postal code, a name or identifier of a place, state, census area, county, township, town, village, borough, parish, municipality, city, country or continent, or a name or identifier of a geological, cultural, historical or linguistic feature of the geographic region.

9. The system of claim 4, wherein the linguistic term comprises a word, expression or reference relating to a spoken language, written language, culture, dialect or jargon, wherein the word, expression or reference includes at least one of: a letter, a character, a grapheme, a glyph, a ligature, a numeric digit, or a punctuation mark.

10. A method for identifying a personal identifier in content, the method comprising:
- receiving, by an entity engine executable on one or more processors, first content to identify one or more candidate personal identifiers;
- comparing, by the entity engine, a text string in the first content and a text string in a first data format specified in a first entity definition of the plurality of entity definitions, the first data format corresponding to a first type of personal identifier from the plurality of types of personal identifiers;
- determining, by the entity engine, a distance between the text string and the first data format;
- determining, by the entity engine, that the text string in the first content matches the first data format based on the distance, each entity definition specifying a corresponding data format for finding a respective type of personal identifier in content, and a rule, wherein the first data format corresponds to a first type of personal identifier from a plurality of types of personal identifiers, wherein the rule specifies:
  - (i) a corresponding level of correlation for at least one of a respective geographic or linguistic term in the content with the respective type of personal identifier for the corresponding data format, wherein the corresponding level of correlation comprises a weight representative of the correlation between the respective type of personal identifier and the at least one of the respective geographic or linguistic term, and
  - (ii) a corresponding threshold level where, when the weight exceeds the corresponding threshold level, the data format is classified as the respective type of personal identifier; and
- classifying, by the entity engine responsive to the determination, the text string as the first type of personal identifier for preventing data breach or exfiltration.

11. The method of claim 10, further comprising finding, by the entity engine, an identifying or descriptive term for the first type of personal identifier, in the first content, and classifying the text string as the first type of personal identifier responsive to finding the identifying or descriptive term in the first content.

12. The method of claim 11, further comprising finding the identifying or descriptive term located within a predefined level of proximity to the text string in the content.

13. The method of claim 10, further comprising:
- determining, by the entity engine, a score based on the distance between the text string and the first data format, wherein the score increases as the distance between the text string and the first data format decreases;
- identifying, by the entity engine, a first level of correlation specified by a first rule of the first entity definition for at least one of a geographic or linguistic term in the first content with the first type of personal identifier;
- identifying, by the entity engine, a first threshold level specified by the first rule of the first entity definition corresponding to the first type of personal identifier;
- determining, by the entity engine, that the first level of correlation satisfies the first threshold level specified by the first rule for the first type of personal identifier; and
- classifying, by the entity engine responsive to the determination and the identification, the text string as the first type of personal identifier for preventing data breach or exfiltration.

14. The method of claim 13, further comprising increasing the score by an amount according to the identified at least one of a geographic or linguistic term in the first content correlated to the first type of personal identifier.

15. The method of claim 13, further comprising increasing the score by an amount according to a level of correlation between the identified at least one of a geographic or linguistic term, and the first type of personal identifier.

16. The method of claim 13, wherein the score is indicative of a likelihood that the text string actually is a personal identifier of the first type.

17. The method of claim 13, wherein the geographic term comprises a name or identifier of a geographic region, a name of an entity located in or associated with the geographic region, an address of the geographic region, or a physical address, email address or telephone number of an entity located in or associated with the geographic region, wherein the name or identifier of a geographic region comprises one or more of: a postal code, a name or identifier of a place, state, census area, county, township, town, village, borough, parish, municipality, city, country or continent, or a name or identifier of a geological, cultural, historical or linguistic feature of the geographic region.

18. The method of claim 13, wherein the linguistic term comprises a word, expression or reference relating to a spoken language, written language, culture, dialect or jargon, wherein word, expression or reference includes at least one of: a letter, a character, a grapheme, a glyph, a ligature, a numeric digit, or a punctuation mark.

\* \* \* \* \*